(12) United States Patent
Al-Filali

(10) Patent No.: US 11,694,143 B2
(45) Date of Patent: Jul. 4, 2023

(54) REYADA SYSTEM AND METHOD FOR PERFORMANCE MANAGEMENT, COMMUNICATION, STRATEGIC PLANNING, AND STRATEGY EXECUTION

(71) Applicant: Isam Yahia Al-Filali, Jeddah (SA)

(72) Inventor: Isam Yahia Al-Filali, Jeddah (SA)

(*) Notice: Subject to any disclaimer, the term of this patent is extended or adjusted under 35 U.S.C. 154(b) by 0 days.

(21) Appl. No.: 17/389,092

(22) Filed: Jul. 29, 2021

(65) Prior Publication Data

US 2021/0357840 A1  Nov. 18, 2021

Related U.S. Application Data

(60) Division of application No. 16/550,960, filed on Aug. 26, 2019, now Pat. No. 11,100,446, which is a continuation of application No. 14/272,435, filed on May 7, 2014, now abandoned.

(60) Provisional application No. 61/820,539, filed on May 7, 2013.

(51) Int. Cl.
  *G06Q 10/00* (2023.01)
  *G06Q 10/0637* (2023.01)

(52) U.S. Cl.
  CPC ... *G06Q 10/06375* (2013.01); *G06Q 10/0637* (2013.01)

(58) Field of Classification Search
  None
  See application file for complete search history.

(56) References Cited

U.S. PATENT DOCUMENTS

| | | | |
|---|---|---|---|
| 6,411,936 B1* | 6/2002 | Sanders | G06Q 10/0639 705/7.29 |
| 8,234,142 B2 | 7/2012 | Kirwan | |
| 8,255,254 B2 | 8/2012 | Kumar et al. | |
| 8,311,863 B1* | 11/2012 | Kemp | G06Q 10/0639 705/7.29 |
| 8,635,101 B2 | 1/2014 | Wright | |
| 8,712,812 B2 | 4/2014 | Snow et al. | |
| 2003/0046125 A1* | 3/2003 | Flores | G06Q 10/0639 705/7.38 |
| 2004/0068429 A1* | 4/2004 | MacDonald | G06Q 30/0201 705/7.29 |

(Continued)

OTHER PUBLICATIONS

Maurya, Ash, A 3x3x3 Perspective forgetting your Vision, Strategy, and Product aligned, Mar. 8, 2017, Leanstack Blog, https://blog.leanstack.com/a-3x3x3-perspective-for-getting-your-vision-strategy-and-product-aligned/, p. 1-12. (Year: 2017).*

(Continued)

*Primary Examiner* — Joseph M Waesco
(74) *Attorney, Agent, or Firm* — Studebaker & Brackett PC

(57) ABSTRACT

Strategic planning and strategy execution is important in organizations of various sizes and types, such as business and industry, government, and nonprofit organizations. While strategic planning and strategy execution are important, present systems and methods present challenges in providing for a system that links all aspects of strategic planning and strategy execution and communicates strategic planning and strategy execution throughout an organization. The present disclosure provides a system and method with an ability to articulate and align objectives, measures, targets, resources, activities, and outputs with desired outcome(s) and desired impact.

11 Claims, 19 Drawing Sheets

(56) References Cited

U.S. PATENT DOCUMENTS

| | | | | |
|---|---|---|---|---|
| 2004/0230463 | A1* | 11/2004 | Boivin | G06Q 10/0637 |
| | | | | 705/7.39 |
| 2006/0085255 | A1* | 4/2006 | Hastings | G06Q 30/02 |
| | | | | 705/14.4 |
| 2008/0270205 | A1* | 10/2008 | Kumar | G06Q 10/06 |
| | | | | 705/7.17 |
| 2008/0270448 | A1* | 10/2008 | Brennan | G06Q 10/06 |
| | | | | 707/999.102 |
| 2008/0281651 | A1* | 11/2008 | Brennan | G06Q 10/0637 |
| | | | | 705/7.39 |
| 2008/0313595 | A1 | 12/2008 | Boulineau et al. | |
| 2009/0192867 | A1* | 7/2009 | Farooq | G06Q 30/0201 |
| | | | | 705/7.29 |
| 2009/0288061 | A1* | 11/2009 | Silvera | G06Q 10/10 |
| | | | | 717/101 |
| 2010/0161360 | A1* | 6/2010 | Clement | G06Q 10/0637 |
| | | | | 705/7.11 |
| 2011/0184745 | A1* | 7/2011 | Brennan | G06Q 10/06 |
| | | | | 705/1.1 |
| 2011/0208564 | A1 | 8/2011 | Ballow et al. | |
| 2011/0251868 | A1 | 10/2011 | Mikurak | |
| 2012/0259679 | A1* | 10/2012 | Barney | G06Q 10/06 |
| | | | | 705/7.37 |
| 2013/0339099 | A1* | 12/2013 | Aidroos | G06Q 50/01 |
| | | | | 705/7.36 |

OTHER PUBLICATIONS

Strategic Planning and Strategic IT Planning for Long-Term and Post-Acute Care (LTPAC) Providers, May 4, 2010, LeadingAge, p. 1-79 (Year: 2010).

* cited by examiner

REYADA SYSTEM AND METHOD FOR PERFORMANCE MANAGEMENT, COMMUNICATION, STRATEGIC PLANNING, AND STRATEGY EXECUTION

CROSS-REFERENCE TO RELATED APPLICATIONS

This application is a divisional application of U.S. patent application Ser. No. 16/550,960, filed Aug. 26, 2019, which is a continuation of U.S. patent application Ser. No. 14/272,435, filed May 7, 2014, which claims the benefit of priority to U.S. Provisional Patent Application No. 61/820,539, filed on May 7, 2013, which are hereby incorporated by reference in their entirety.

TECHNICAL FIELD

This disclosure relates to systems and methods of performance management, communication, strategic planning, and strategy execution.

BACKGROUND

In any environment where strategic planning and strategy execution are conducted, which includes performance management and communication of management goals, vision, objectives, measures, and desired outcomes, various techniques have been created to perform and align various aspects of the strategic planning and strategy execution. For example, a technique called a balanced scorecard and a technique called a logic model perform some aspects of strategic planning and strategy execution. The balanced scorecard is used mainly to measure, monitor, and report performance indicators of programs. Once overall strategies have been defined, the logic model is employed for development of details of individual programs, including performance indicators.

SUMMARY

This disclosure provides a system comprising a processor, a first input device connected to the processor, a second input device connected to the processor, a first input/output device connected to the processor, a communication system connected to the processor, and a template. The processor having a non-transitory memory and the template being stored in the non-transitory memory. The processor is configured to first receive a first input from the first input device, the first input device receiving the first input from a first user, the first input including a vision, a goal, and a strategy. The processor is also configured to second receive a resource input from the second input device. The processor is further configured to first transmit the first input to the first input/output device. The first input/output device is configured to third receive the first input from the processor, present the first input to a second user, fourth receive a second input from the second user, the second input including an objective, a measure, and a target for a perspective, the objective, and the measure. The target is generated in view of the vision, the goal, and the strategy. The perspective is at least one of an organization financial perspective, an organization customer perspective, an organization internal business processes perspective, and an organization learning and growth perspective. The objective includes a causal relationship to the measure, and the measure includes a causal relationship to the target. The first input/output device is also configured to second transmit the second input to the processor. The processor is further configured to fifth receive the second input from the first input/output device, sixth receive at least one measurement of a plurality of activities, determine an outcome and an impact based at least in part on the second input, an inventory input, and the at least one measurement to thereby establish a causal link between the perspective, the outcome, and the impact. The processor is still further configured to third transmit one or more of the vision, the goal, the strategy, the objective, the measure, the target, the outcome, the impact, and the causal link to a third user by way of the communication system. The template is configured for documenting a plurality of the vision, the goal, the strategy, the objective, the measure, the target, the resource input, the organization financial perspective, the organization customer perspective, the organization internal business processes perspective, the organization learning and growth perspective, the outcome, the impact, and the at least one measurement.

Advantages and features of the embodiments of this disclosure will become more apparent from the following detailed description of exemplary embodiments when viewed in conjunction with the accompanying drawings.

DETAILED DESCRIPTION

Figure 1:
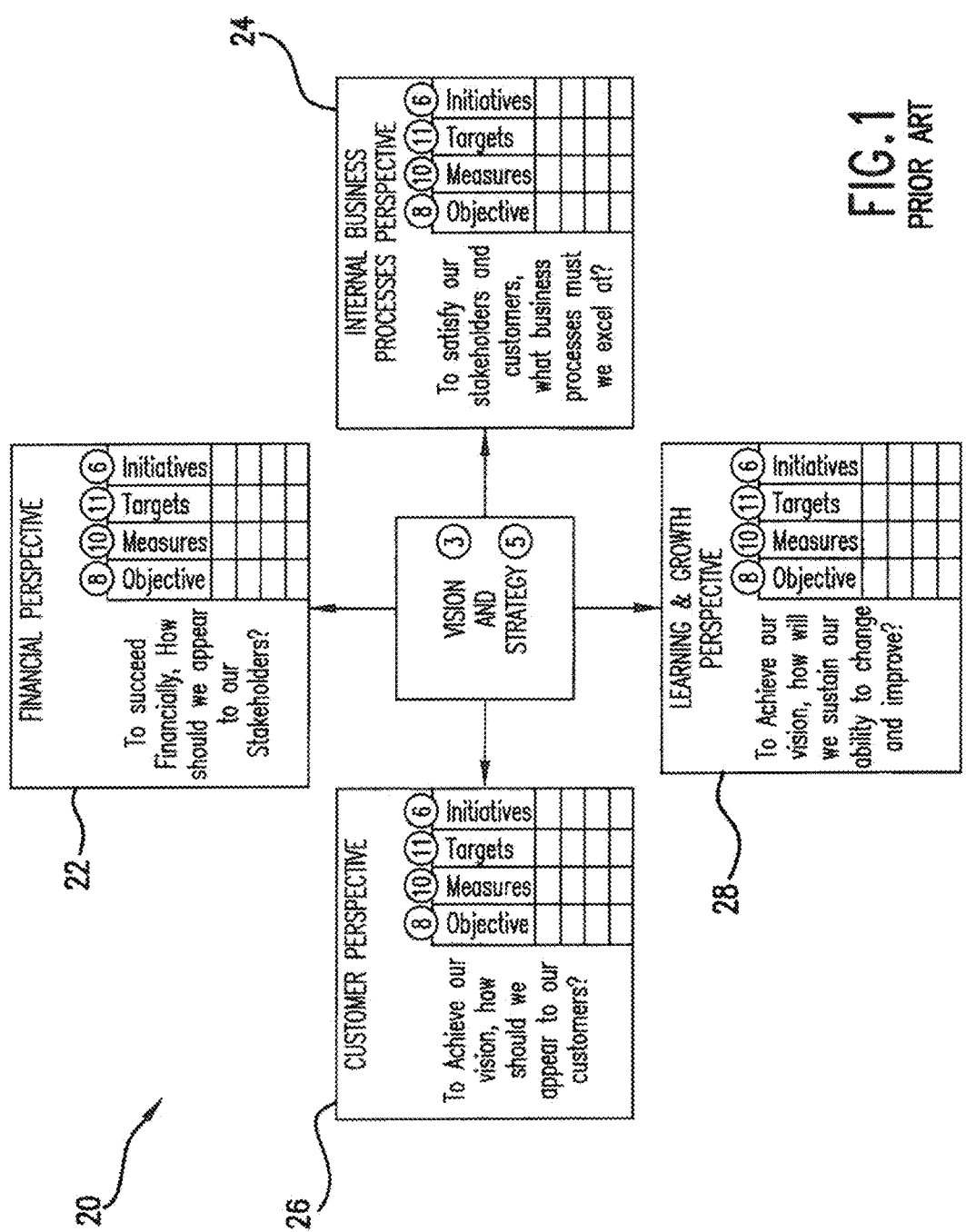
FIG. 1 is a representation of a conventional balanced scorecard.

Strategic planning and strategy execution is often important in organizations of various sizes and types, such as business and industry, government, and nonprofit organizations. While strategic planning and strategy execution are important, present systems and methods present challenges in providing for a system that links all aspects of strategic planning and strategy execution and communicates strategic planning and strategy execution throughout an organization. As described further hereinbelow, the present disclosure uses one or more Key Performance Indicators (KPI's) as a part of strategic planning and strategy execution, and the system and method of the present disclosure, which may be termed a Reyada system and method for performance management, communication, strategic planning, and strategy execution, provide an ability to articulate and align objectives, measures, targets, resources, activities, and outputs with desired outcome(s) and desired impact(s).

Applicant recognized that many organizations do an adequate job of strategic planning, only to see the effort go to waste as execution fails, which may be due to poor alignment of objectives, measures, targets, resources, activities, and outputs with desired outcomes, and a lack of understanding of how a strategic initiative, which requires the strategic planning and strategy execution, works, and the staff responsibilities required to make the strategic initiative work. In order to successfully execute a corporate strategy, a communication tool that facilitates communication of one or more corporate strategic objectives, measures, targets, initiatives, and desired outcomes to all levels of a workforce and one or more stakeholders is valuable. Such a tool is preferably implemented with a controller and system to provide the benefits of such equipment, including rapid communication of a changing environment and coordination between geographically separated portions of an organization. In addition, aligning the corporate strategy to an operational execution is critical to the success of implementing the corporate strategy. However, organizations routinely fail to transition a planning effort for a corporate strategy beyond a corporate planning activity into one or more operational layers of the organization. The Reyada system and method of the present disclosure provide a plurality of links from corporate strategic objectives to execution of objective-supporting corporate strategic initiatives.

The present disclosure provides an integrated model that seamlessly combines the capabilities of the balanced scorecard and the logic model approaches as well as providing additional capabilities to allocate and manage resources, to keep the strategic initiative on track, and to communicate quickly and effectively with the workforce and the stakeholder(s), especially when using one or more controllers and dispersed computing, such as a server and individual communications devices, which may include wired or wireless enabled laptops, tablets, smart phones, and other devices with the ability to connect to other similar devices, either directly or through a server. The integrated model features powerful tools to facilitate translating corporate strategy and management strategy objectives into actionable strategic initiatives. The integrated model also provides the capability to monitor performance of various strategic activities with non-financial and financial measures. The integrated model includes a framework that articulates and aligns objectives, measures, and targets with desired outcomes. The integrated model brings strategic initiative concepts and dreams to life and lets stakeholders try ideas and apply theories to a model or picture of how the strategic initiative would function, and provides stakeholders with a road map describing a sequence of related events connecting the need for the strategic initiative with the strategic initiative's desired outcomes or results. The integrated model helps stakeholders, some of whom may be members of the workforce, visualize and understand how human and financial investments can contribute to achieving intended or desired strategic initiative outcomes or goals and can lead to strategic initiative improvements. The integrated model can serve as a workforce communication tool that facilitates communication of corporate strategic objectives, measures, targets, and desired outcomes to all levels of the workforce and to stakeholders, especially when coupled with a controller or server connected to communication devices of the workforce and stakeholders, such as wired or wirelessly connected laptops, tables, PDA's, smart phones, and other devices performing similar functions.

Referring to FIG. 1, a balanced scorecard is shown and indicated generally at 20. Balanced scorecard 20 was originated by Dr. Robert Kaplan of the Harvard Business School and Dr. David Norton in the mid-1990's as a performance measurement framework that added strategic non-financial performance measures to traditional financial metrics to give corporate managers and executives a "balanced" view of organizational performance. The balanced scorecard can be used by managers to keep track of the execution of corporate activities by the workforce or staff within their control and to monitor the consequences arising from these corporate activities. The balanced scorecard is one of the most widely adopted performance management tools or frameworks reported in a 2013 annual survey of management tools conducted by Management Tools & Trends published by Bain & Company.

Balanced scorecard 20 is a strategic planning and strategic management framework or system used extensively in business and industry, government, and nonprofit organizations worldwide to align corporate activities to the corporate vision and corporate strategy of the organization, to improve internal and external communications, and monitor organizational performance against management or strategic goals. Balanced scorecard 20 assists organizations in overcoming two fundamental problems: effectively measuring organizational performance, and successfully implementing corporate strategy. Balanced scorecard 20 also represents a balance between: financial and nonfinancial indicators; internal and external constituents of the organization; and leading and lagging indicators. The financial indicators may be represented as a financial perspective 22. Nonfinancial indicators may be represented as an internal business processes perspective 24, a customer perspective 26, and a learning and growth perspective 28. The balanced scorecard further translates a mission, one or more values, the vision, and the corporate strategy into the plurality of perspectives, including financial perspective 22, internal business processes perspective 24, customer perspective 26, and learning and growth perspective 28.

Financial perspective 22 includes one or more financial objectives that represent the long term goal of the organization to provide superior returns based on an invested capital. Financial objectives typically relate to a measured profitability, an organization's liquidity, and a financial stability of the organization. Each profitability-related measure should be part of a link of cause-and-effect relationships that cumulate in improving financial performance. One or more financial performance measures indicate whether an organization's corporate strategy, an implementation of the corporate strategy, and an execution of the corporate strategy are contributing to a bottom line improvement in profitability. Financial perspective 22 objectives are preferably linked to a sequence of activities that must be accomplished with one or more financial processes, customers, one or more internal processes, with the workforce or employees, and with one or more corporate or organization systems to deliver long term economic performance.

Internal business processes perspective 24 enables organizations to identify the processes that are the most critical processes for achieving one or more customer and financial objectives. Each organization has a unique set of processes for creating value for customers and producing financial results. The process of deriving objectives and measures for internal business processes perspective 24 is based on at least one strategy to meet stakeholder, stockholder, and targeted customer expectations. Examples of critical internal business processes include innovation, operations, and post-sale support processes.

Learning and growth perspective 28 enables organizations to develop learning and growth objectives and measures to drive organizational learning and growth to achieve breakthrough organizational performance. Learning and growth perspective 28 objectives provide an infrastructure to enable and drive excellent outcomes of financial perspective 22 objectives, internal business processes perspective 24 objectives, and customer perspective 26 objectives. Attributes that may be used to identify specific objectives of learning and growth perspective 28 include workforce or employee capabilities, information system capabilities, workforce or employee and management motivation, workforce or employee empowerment, and organizational alignment. Organizational alignment occurs when all levels of management and the workforce are working toward the same organizational goals.

Customer perspective 26 enables organizations to align a plurality of core customer outcome measures, and to identify and measure at least one value proposition the customer outcome measures will deliver to targeted customers and to market segments. Core customer outcome measurements include customer or market share, retention, acquisition, satisfaction, and profitability. Attributes that may be used to identify specific value proposition objectives and measures for targeted customers and market segments include product and service attributes, customer relationships, organization or product image, and organization or product reputation.

Conventional balanced scorecard 20 may be viewed as basically an intuitive framework that guides development of appropriate tools for strategic management, which are compatible with the nature of organization and surrounding circumstances without the restrictive confines of the original model. Emerging tools could be totally different in appearance and content from the original skeletal structure. One could envision a generic balanced scorecard that can involve more than four dimensions, has drastically different performance measures, and is flexible enough to allow adaptation to entirely different organizations with diverse priorities, discrete characteristics, and distinct underlying situations. A new tool has to befit the evolution of economy and society and underscores the changing priorities of institutions. While a growing finance and associated shareholders' content were the prime mover of earlier planners and managers, knowledge is becoming at the forefront of any strategic management schema.

Figure 2:
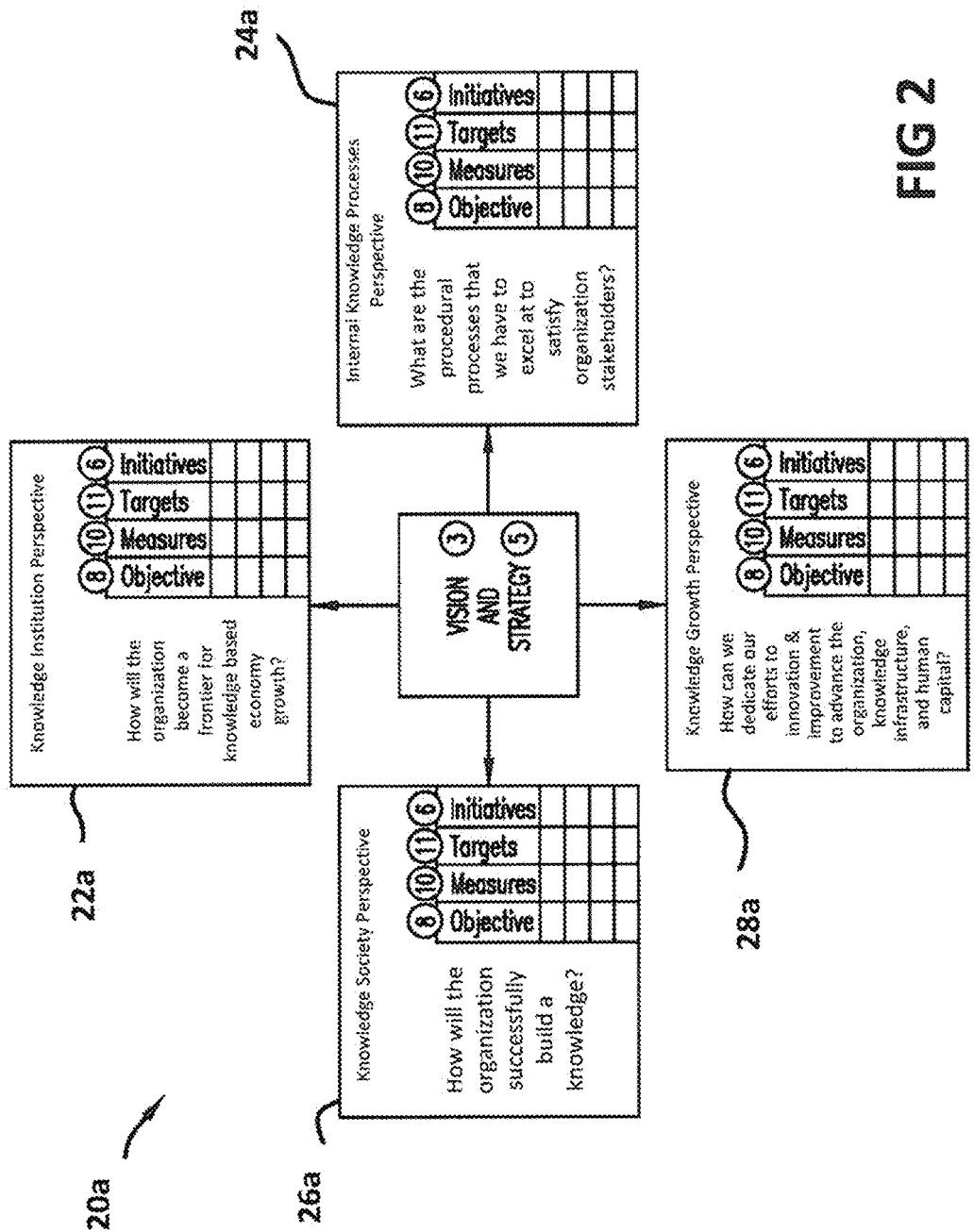
FIG. 2 is a representation of a generic Reyada balanced scorecard for not-for-profit organizations.

Referring to FIG. 2, a newly formulated Reyada balanced scorecard is shown and indicated generally at 20a. Reyada balanced scorecard 20a gives corporate managers and executives a "balanced" view of organizational performance. Reyada balanced scorecard 20a can be used by managers to keep track of the execution of corporate activities by the workforce or staff within their control and to monitor the consequences arising from these corporate activities, preferably when coupled with a communication system including a plurality of communication devices, such as wired or wireless personal computers, laptops, tablets, PDA's, smart phones, and other devices performing a similar function. Indeed, it can be expensive and cumbersome to implement Reyada balanced scorecard 20a in the absence of such a system, given the typical geographic separation of the input sources and the need to communicate in relatively short time frames, such as hours or even minutes. Further, Reyada balanced scorecard 20a may be ineffective in the absence of a communication system that permits effective inputs and outputs from a plurality of workforce personnel, staff, and/or stakeholders.

Novel multi-dimension knowledge-based balanced scorecard 20a is devised as a component of the Reyada System. Reyada balanced scorecard 20a is compatible with the driving forces of a knowledge-based economy and harmonious with the vivacity of a knowledge-based society, building on the capabilities of a pervasive communication system connecting workforce, staff, and stakeholders that features near instantaneous communication via computers, such as PC's and laptops, netbooks, tablets, PDA's, smart phones, and other devices having equivalent capabilities. The associated indicators of Reyada balanced scorecard 20a, such as innovation and knowledge exchange, may be taken into account when a balance between different perspectives needs to be stricken. The flexibility and versatility of the disclosed Reyada balanced scorecard allows individual organizations to customize situation-aware tools compatible with their aspirations and strategic management philosophy and compatible available communication tools for the efficient and effective coordination of inputs and outputs.

In any of the balanced scorecard forms, identification of perspectives and associated key performance indicators (KPI), whether leading indicators (evidencing and measuring performance in the organization) or lagging indicators (performance drivers), need to be consistent with the following rules: The perspectives are: unique and totally independent from each other with no overlaps between them; alignable with the strategy or strategic vision; compatible with the mission of the organization and accentuation of the knowledge capital. The indicators are commensurable and independent and inclusive of knowledge related variables. Both the perspectives and the indicators are accommodating for diversity among components of the organization and tailored to prevailing institutional, societal, and economic environments.

Reyada balanced scorecard 20a is a strategic planning and strategic management framework or system that can be used extensively in business and industry, government, and most particularly nonprofit organizations worldwide to align corporate activities to the corporate vision and corporate strategy of the organization, to improve internal and external communications, and monitor organizational performance against management or strategic goals. Reyada balanced scorecard 20a, when combined with a communication system and one or more controllers to connect input sources to appropriate processing capabilities and providing outputs to one or more users, such as staff, workforce, and/or stakeholders, assists organizations in overcoming two fundamental problems: effectively measuring organizational performance; and successfully implementing corporate strategy. Reyada balanced scorecard 20a also represents a balance between: key performance indicators; internal and external constituents of the organization; and leading and lagging indicators. Reyada balanced scorecard 20a further translates a mission, one or more values, a vision, and a corporate strategy into a plurality of perspectives, including a knowledge institution perspective 22a, an internal knowledge processes perspective 24a, a knowledge societal perspective 26a, and an indispensable knowledge growth perspective 28a. The four perspectives are independently aligned with the institution's vision and strategic objectives. Reyada balanced scorecard 20a is an aid to assure proper overall outcome, noting that even the best objectives can be achieved badly when the improvement of one aspect can be accomplished at the expense of another. The financial aspects of the institution are not clangorously inserted as an independent dimension; rather they are embedded in the KPIs of each dimension, whether directly or indirectly. Outreach to the community, and contribution to the wellness and building of the knowledge foundation of the society in general will attract financial contributions to advance the knowledge infrastructure of the institution. Grounding internal processes on knowledge will direct organization efforts to promote innovation and materialize inventions that can be an independent source of income through licensing and attract funds from the private sector.

Internal knowledge processes perspective 24a focuses on enhancement of the robustness and resilience of institution internal processes, both competitive and collaborative, and enables organizations to identify the processes that are the most critical processes for achieving one or more societal and institutional objectives. Each organization has a unique set of processes for creating value for society and producing knowledge-based economic results. The process of deriving objectives and measures for internal knowledge processes perspective 24a is based on at least one strategy to meet societal, and targeted stakeholder expectations. Examples of critical internal knowledge processes include innovation, operations, and operation support processes.

Knowledge growth perspective 28a enables organizations to develop indispensable knowledge growth objectives and measures to drive organizational knowledge growth to achieve breakthrough organizational performance. Knowledge growth perspective 28a objectives provide an improved human resources and knowledge infrastructure to enable and drive excellent outcomes of institution perspective 22a objectives, internal knowledge processes perspective 24a objectives, and knowledge societal perspective 26a objectives. Attributes that may be used to identify specific objectives of knowledge growth perspective 28a include workforce or employee capabilities, information system capabilities, workforce or employee and management motivation, workforce or employee empowerment, and organizational alignment. Organizational alignment occurs when all levels of management and the workforce are working toward the same organizational goals.

Societal perspective 26a enables organizations to align a plurality of core societal outcome measures, and to identify and measure at least one value proposition the stakeholder outcome measures will deliver to targeted societal segments. Core societal outcome measurements include stakeholders' share, retention, acquisition, and satisfaction. Attributes that may be used to identify specific value proposition objectives and measures for targeted societal segments include product and service attributes, societal relationships, organization or product image, and organization or product reputation.

A comparison between the focus of conventional balanced scorecard 20 of FIG. 1 and Reyada balanced scorecard 20a of FIG. 2 is given in Table 1. The questions to be answered by each perspective are compared in Table 2 for conventional balanced scorecard 20 of FIG. 1 and Reyada balanced scorecard 20a of FIG. 2.

TABLE 1

Focus of Conventional and Reyada Balanced Scorecards

| Dimension | Conventional Balanced Scorecard | Dimension | Reyada Balanced Scorecard |
|---|---|---|---|
| Financial 22 | Improve organizational shareholder value | Institutional 22a | Improve institutional knowledge value |
| Customer 26 | Improve customer satisfaction and relations | Societal 26a | Improve satisfaction and relations with all society segments |
| Internal Business Processes 24 | Optimize particular internal business processes | Internal Knowledge Processes 24a | Enhance robustness and resilience of institutional internal processes, both competitive and collaborative |
| Learning and growth 28 | Continuous organizational learning and growth | Knowledge Growth 28a | Improve human resources and knowledge infrastructure |

TABLE 2

Questions to be answered by the Conventional and Reyada Balanced Scorecards

| Dimension | Balanced Scorecard | Dimension | KBSC |
|---|---|---|---|
| Financial 22 | How should we appear to our shareholders? | Institutional 22a | How will the institution as an integrated organization become a guide light of knowledge, and a frontier for economic growth? |
| Customer 26 | How should we appear to our customers? | Societal 26a | How will the institution successfully build a knowledge society through scientific, cultural and pioneering research distinction? |
| Internal Business Processes 24 | What processes must we excel at? | Internal Knowledge Processes 24a | What are the procedural processes that we have to excel at to satisfy institution stakeholders? |
| Learning and growth 28 | How can we sustain our ability to change and improve? | Knowledge Growth Requirements 28a | How can we dedicate our efforts to innovation and improvement to advance institution knowledge infrastructure and human capital? |

Figure 3:
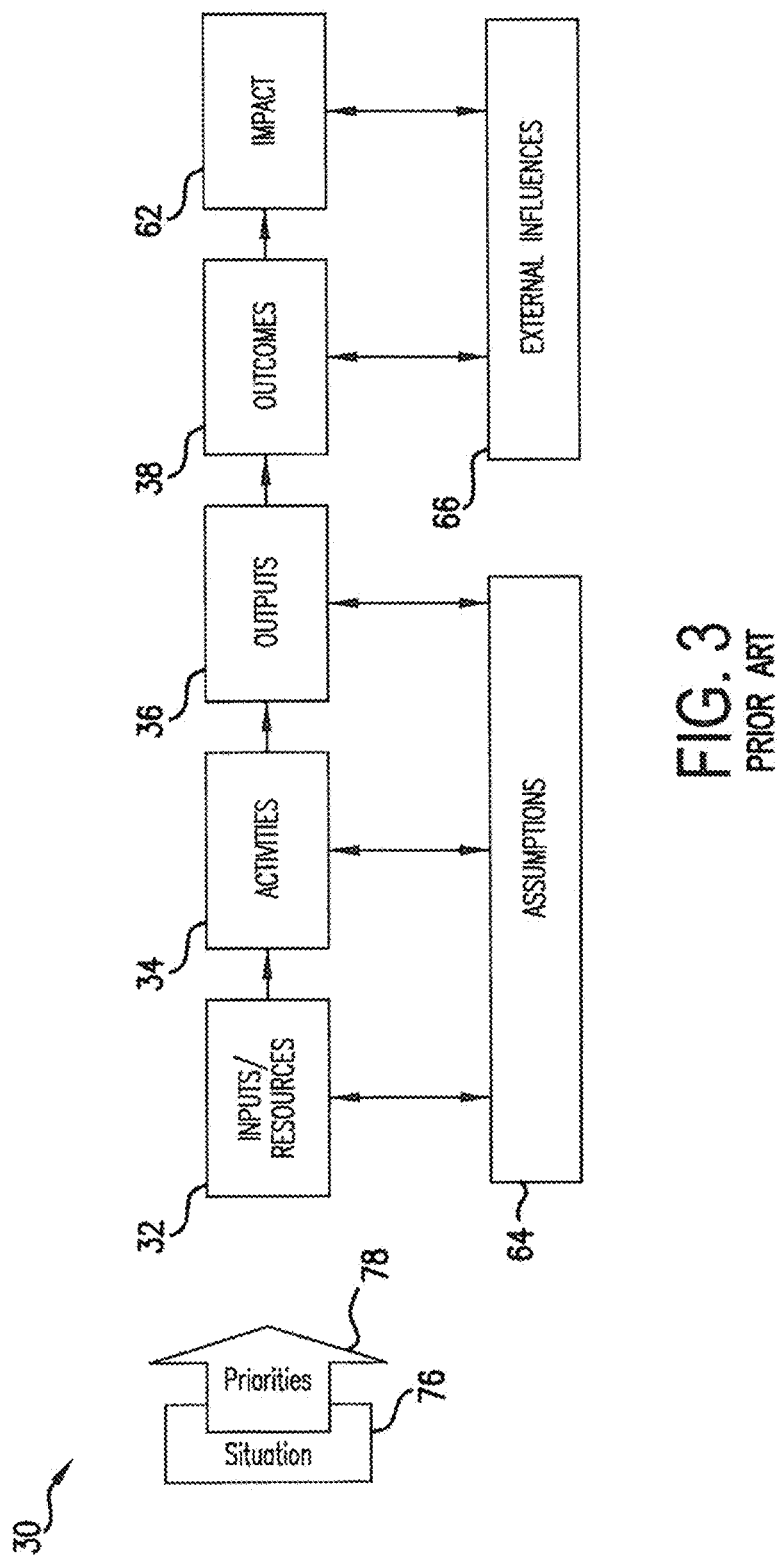
FIG. 3 is a representation of a conventional logic model.

Referring to FIG. 3, a logic model is shown and generally indicated at 30. The term "logic model" surfaced in the mid-1990's when it began to be applied to a framework developed in the 1960's and the 1970's by Edward Suchman, reference *Evaluative Research: Principles and Practice in Public Service and Social Action Programs*, by E. A. Suchman, copyright 1967, and by Carol Weiss, reference—*Evaluation Research: Methods for Assessing Program Effectiveness*, by C. Weiss and published by Prentice-Hall, copyright 1972. The logic model was enhanced by Joseph Wholey, reference *Evaluation and Effective Public Management*, by J. S. Wholey and published by Little-Brown, copyright 1983, and by Peter Rossi and Howard Freeman in the 1980's, reference *Evaluation: A Systematic Approach*, by P. H. Rossi and H. E. Freeman and published by Sage Publications, copyright 1987.

Logic model 30 is used to paint a picture of how an organization's proposed strategic initiative will work. Logic model 30 is a graphical depiction of the logical relationships between a plurality of elements, including resources 32, a plurality of activities 34, at least one output 36, and at least one outcome 38 of the strategic initiative, which may be considered elements of logic model 30. These elements are driven by a situation 76 and priorities 78. While there are many ways in which logic model 30 and logic models in general can be presented, the underlying purpose of constructing a logic model is to assess at least one if-then causal relationship between the elements of the strategic initiative. If resources 32 are available for the strategic initiative, then activities 34 can be implemented. If activities 34 are implemented successfully, then at least one output 36 and at least one outcome 38 can be expected. At least one impact may also result from activities 34, described in further detail hereinbelow.

Logic model 30 is a tool used most often by managers and evaluators of strategic initiatives to evaluate the effectiveness of a strategic initiative. Logic models are most often used in the evaluation stage of a strategic initiative. However, logic models can be used during planning and implementation. Logic models are a systematic and visual way to present and share the understanding of the relationship among the plurality of resources 32 available to operate the strategic initiative, the plurality of activities 34 planned to accomplish the strategic initiative, and at least one outcome 38 desired from the strategic initiative, which may be described as a change or a result.

Figure 4:
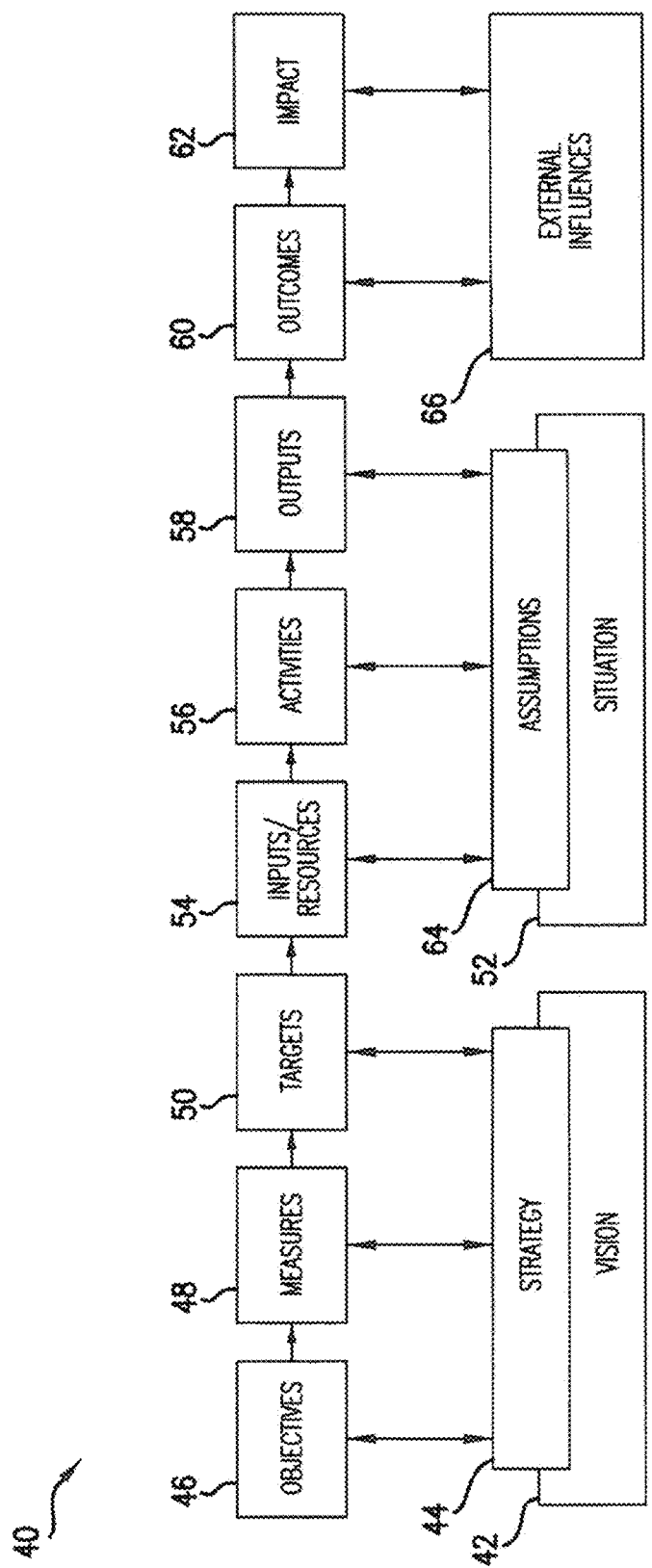
FIG. 4 is a process flow of an integrated model in accordance with an exemplary embodiment of the present disclosure.

Referring to FIG. 4, an integrated model is shown and generally indicated at 40. Integrated model 40 of the present disclosure is a visual performance management framework that enables holistic and pervasive operational performance management across an entire business. Integrated model 40 leverages the capabilities, benefits, and advantages of both the balanced scorecard and the logic model approaches. Integrated model 40 develops cause-and-effect or causal relationships between an organization's objectives, measures, and targets and the organization's strategic initiative's inputs or resources, activities, and outputs. Integrated model 40 also predicts, monitors and evaluates one or more outcomes and impacts within four balanced perspectives, financial, customer, internal business processes, and learning and growth. Thus, integrated model 40 transforms objectives, measures, targets, inputs, activities, and outputs into predicted outcomes and impacts.

Integrated model 40 as shown as a block diagram in FIG. 4 is a systematic way to present major components or elements of a strategic initiative. In the context of this disclosure, a strategic initiative is a tool of the strategy execution and often requires organizational cross-functional support to succeed. The strategic initiative consists of a collection of finite duration discretionary programs and projects that are designed to help the organization achieve its targeted performance. The strategic initiative responds to a strategic issue or situation that, when resolved, will have a significant impact on a desired organization performance. The strategic initiative includes planning, management, and evaluation. It should thus be understood that integrated model 40 may also be described as strategic initiative integrated model 40.

FIG. 4 describes key causal relationships between an organizations vision 42 and an organization's strategy 44 with a strategic initiative's objectives, 46, performance measures 48, and targets 50. In the context of this disclosure, vision 42 is an aspirational description of what an organization would like to achieve or accomplish in the mid-term or long-term future. Vision 42 is intended to serve as a clear guide for choosing current and future courses of action.

Strategy 44 is a direction and a scope of an organization over the long term, which achieves advantages for the organization through its configuration of resources within an environment that is often challenging. Strategy 44 is intended to meet the needs of one or more markets and to fulfill stakeholder expectations of the organization. Strategy 44 is an expression of what the organization must do to get from one reference point to another reference point, and is usually developed at the top levels of the organization, but is often or even typically executed by lower levels within the organization. In general, strategies, such as strategy 44, are thoughtfully constructed plans, methods or actions of how to achieve a goal, objective 46, or a mission.

Objectives 46 are what an organization must do to achieve its goals or outcomes and to make its strategy 44 succeed. Each strategic objective 46 relates to a goal, and there may be more than one objective 46 to help achieve a goal. Any strategic objective, such as objective 46, is preferably Specific, Measurable, Achievable, Realistic, and has a Timeline, which are sometimes called the SMART criteria. Performance measures 48 are a quantitative or qualitative tool to assess progress toward an outcome or a goal. Every performance measure 48 selected should be part of a link of cause-and-effect relationships that cumulate in improving business performance. Targets 50 are the expected levels of performance or improvement required in the future. Targets 50 are used to evaluate performance measurement data to access performance achieved compared to performance expected. Targets 50 put teeth into strategy 44 by imposing criteria that the organization must achieve.

A situation statement 52 describes the problem or challenge—a strategic situation—that will be resolved by the strategic initiative. Situation statement 52 communicates the relevance of the strategic initiative and establishes a baseline for comparison at a closure of the strategic initiative. Situation statement 52 includes information about the problem or challenge. For example, what are the causes of the problem or challenge, the symptoms of the problem or challenge, and the likely consequences if nothing is done to resolve the problem or challenge. Situation statement 52 may include the actual or projected costs of the problem or challenge, a description of who is affected by the problem or challenge, and the importance of the problem or challenge to stakeholders.

Integrated model 40 also identifies and provides cause-and-effect relationships between at least one input or resource 54, at least one planned activity 56, at least one output 58, and at least one outcome 60. The cause-and-effect relationships may also include at least one impact 62. Integrated model 40 further identifies at least one assumption 64 about the people involved in the strategic initiative, inputs or resources 54, the way leadership thinks integrated model 40 will work, and strategy 44. In addition, integrated model 40 identifies and provides cause-and-effect relationships between outcome(s) 60, impact(s) 62, and at least one external influence 66 that may affect desired results from the strategic initiative.

Inputs or resources 54 are the available resources to make planned activities 56, which are part of a strategic initiative scope of work, operational, and are essential for planned activities 56 to occur. Inputs or resources 54 include one or more human, financial, and organizational resources that a strategic initiative has available to direct toward performing planned activities 56. Examples of inputs or resources 54 include people, funds, facilities, knowledge, time, utilities, raw materials, finished materials, expendable supplies, transportation, etc.

Planned activities 56 are those tasks or scope of work that the strategic initiative accomplishes using inputs or resources 54. Activities 56 are one or more processes, operational or systemic tools, events, technology, and actions that are an intentional part of the implementation of the strategic initiative. Activities 56 are used to bring about outcome(s) 60 and potentially one or more impact(s) 62.

Output(s) 58 are the products, capital goods, and services that result from a strategic initiative, which may also be consider a development intervention because a strategic initiative attempts to intervene or change the way things are done at an organization. In some cases, such intervention may be to put into place new systems, methods, technologies, etc. that previously did not exist. In other cases, such intervention may be to modify existing systems, methods, technologies, etc. Output(s) 58 may also include changes resulting from the development intervention which are relevant to the achievement of outcome(s) 60. Output(s) 58 are typically the direct result of planned activities 56.

Output(s) 58 are an indication or measure of activities 56 to show that activities 56 have been completed and that activities 56 necessary to achieve objectives 46 have been identified. Output(s) 58 are usually described in terms of the size or scope of the services and products delivered or produced by the strategic initiative. Output(s) 58 indicate if a strategic initiative was delivered to the intended audience(s) in the intended dose, amount, or quantity. Strategic initiative output(s) 58 might be, for example, the number of classes taught, meetings held, materials produced, materials distributed, strategic initiative participation rates, strategic initiative demography, and/or the hours of each type of service produced.

Describing output(s) 58 allows us to establish linkages between situation statement 52 and impact(s) 62 of the strategic initiative. Examples of output(s) 58 that help link situation statement 52 and impact(s) 62 include: publications such as articles, bulletins, fact sheets, handbooks, and web pages; decision aids such as software, worksheets, models; teaching events such as workshops, field days, tours, and short courses; and discovery and application activities, such as research plots, demonstration plots, and product trials.

Outcome(s) 60 are the observable behavioral, institutional, and societal changes that take place over three to ten years, usually as a result of coordinated short term investments in individual and organizational capacity building for key development stakeholders. Outcome(s) 60 are the benefits, changes, or results anticipated to be derived from planned activities 56 and output(s) 58. Outcome(s) 60 provide an answer to what happened as a result of the strategic initiative, and outcome(s) 60 are useful to communicate the effects of the investment. Examples of outcome(s) 60 are specific changes in behavior or attitude of strategic initiative participants, knowledge, skills, status, and level of functioning. Strategic initiative outcome(s) 60 may be short term, intermediate term, or long term.

Short term outcomes should be attainable within one to three years. Examples of short term outcomes include changes in awareness, knowledge, skills, motivation, and attitude. Awareness includes customer recognition of the problem or challenge. Knowledge includes customer understanding of the cause(s) of the problem or challenge and potential solutions to the problem or challenge. Skills include customer possession of the skills needed to resolve the problem or challenge. Motivations include a customer desire to effect change. Attitude or behavior includes customer belief that their actions can make a difference in resolving the problem or challenge.

Intermediate term outcomes are often achievable within four to six years. Examples of intermediate term outcomes include changes that follow the short term outcomes, such as changes in practices, behaviors, policies, technologies, and management strategies. Practices are those procedures or steps used by participants in the organization, for example stakeholders, management, the work force, and in some cases, customers. Behaviors are exhibited by people, or collectively, organizations or groups within organizations. Policies are adopted by businesses, governments, and other types of organizations, and guide how the organization is operated. Technologies are those employed by the workforce and management, but also may include technologies employed by customers, suppliers, and stakeholders. Management strategies are typically implemented by individuals or groups on the management team or those with implied management authority, such as team leaders or teams empowered to implement management strategies.

Long term outcomes are often achievable within seven to ten years. Long term outcomes typically follow intermediate term outcomes when changed behaviors result in changed conditions, for example improved economic conditions, improved social conditions, improved environmental conditions, and improved political conditions. Improved economic conditions may include increased income or financial stability. Improved societal conditions may include reduced violence or improved cooperation between members of society. Improved environmental conditions may include improved air quality, decreased soil erosion, reduced runoff, and the like. Improved political conditions may include improved participation by members of a society or opportunity for members of a society.

Impact 62 is a fundamental intended or unintended change occurring in organizations, communities, or systems as a result of the strategic initiative's planned activities 56 within seven to ten years. Impact(s) 62 are the positive and/or negative, primary and secondary long term effects produced by the strategic initiative development intervention, either directly or indirectly, and either intended or unintended. Impact(s) 62 are the observable and measurable aspects of behavior, attitude, skills, knowledge, and other attributes that change as a result of involvement of the strategic initiative.

Assumption(s) 64 are the principles, beliefs, and ideas participants have about the strategic initiative, the people involved, and the way participants think it will work. Assumption(s) 64 are often qualitative assessments as opposed to quantitative assessments and are validated with research and experience. Examples of assumptions include the problem, challenge, or situation, resources and staff, methodologies, expectation of achievement, knowledge base, internal and external environment, and participants. The nature of assumptions can affect the progress of a strategic initiative by distorting, confusing, or misleading various elements of the strategic initiative.

External influence(s) 66 include the condition(s) that influence the success of the strategic initiative that are external to the strategic initiative and may be external to the organization. The strategic initiative has little or no control over external influence(s) 66. The environment in which the strategic initiative exists includes a variety of external factors that interact with and influence the action(s) of the strategic initiative. For example, institutional, community, and public policies may have either supporting of antagonistic effects on the strategic initiative. At the institutional level, schools may influence healthy eating habits in ways that are beyond the control of the organization, but these same influences may lead to wider social change. Documenting the social, physical, political, and institutional environments that can influence outcome(s) 60 helps to improve a planning process of the strategic initiative by identifying important partners and collaborators for the strategic initiative, the parts of the problem or challenge that the strategic initiative is able to realistically influence, the evaluation measures that will accurately reflect outcome(s) 60 of the strategic initiative, and any other needs that must be met in order to address the problem or challenge.

Figure 5:
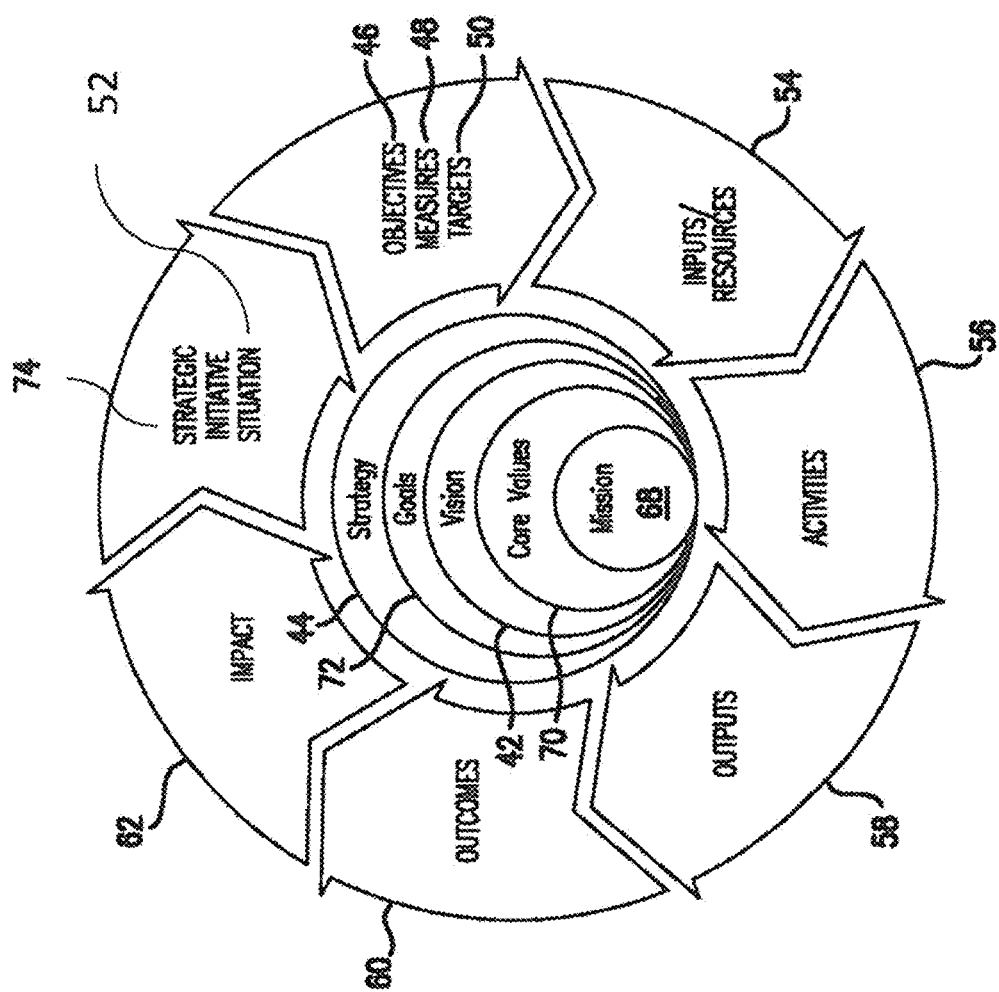
FIG. 5 is an alternative version of the process flow of FIG. 4.

Referring to FIG. 5, an alternative version of the process flow of FIG. 4 is shown. FIG. 5 show an organization's strategic plan components, which are expressed in terms of an organization's mission 68, core values 70, vision 42, strategic goal(s) 72, and strategy 44. Strategic priorities will be used to generate a set of strategic initiative(s) 74, each of which is devoted to a specific situation, described in situation statement 52. Each strategic initiative 74 is aligned with specific objectives 46, performance measures 48, and targets 50. Each strategic initiative 74 requires specific inputs or resources 54 to perform planned activities 56. One or more initiative output(s) 58 are the direct result(s) of planned activities 56. Output(s) 58 provide one or more outcome(s) 60 and impact(s) 62, which are the benefits, changes or results from strategic initiative 74.

Mission 68 is often embodied as a mission statement, which is a brief description of an organization's fundamental purpose and may be a snapshot of the organization's current business. Core values 70 are a set of ideals that stakeholders value for the organization and that stakeholders use to make decisions and to keep the organization on track. Strategic goal(s) 72 are the milestone(s) an organization expects to achieve that evolve from the situation or strategic issue embodied in situation statement 52. Strategic goal(s) 72 transform strategic issues into specific performance targets 50 that can impact the entire organization. Strategic priorities are determined when strategic objective(s) 46 are ranked by their importance in achieving strategic goal(s) 72. All subsequent operational or tactical planning and resource allocation is based upon the strategic priorities.

Figure 6:
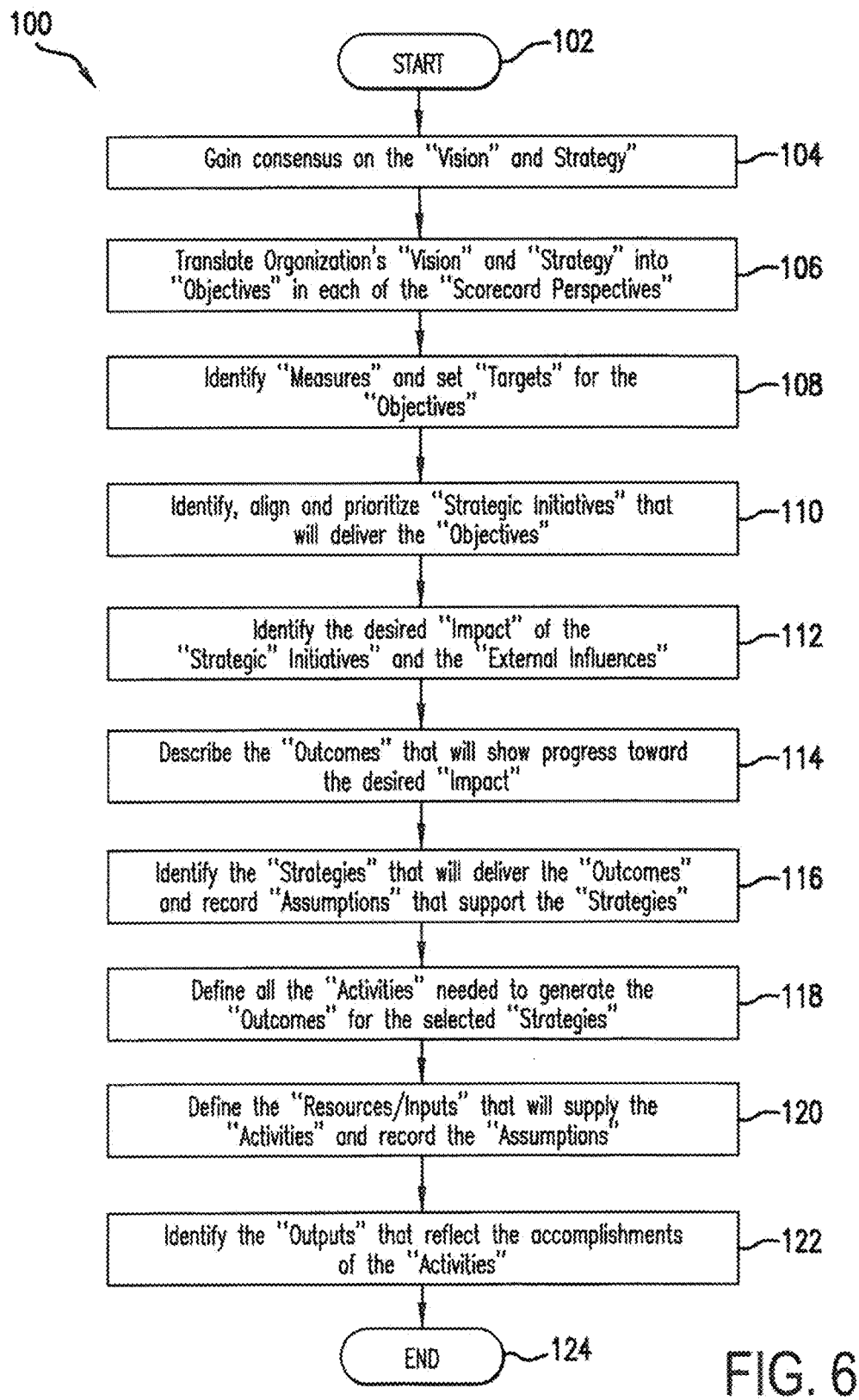
FIG. 6 is a process flow diagram for the integrated model of FIG. 4 in accordance with an exemplary embodiment of the present disclosure.

Referring to FIG. 6, a Strategy Planning and Implementation (SPI) process flow is shown and generally indicated at 100. Strategy implementation is a process by which strategy 44 is turned into a set of actions, including strategic initiative(s) 74, programs, and projects. Organizations achieve their goals and create value through strategy implementation. The strategy implementation transforms an organization's conceptualized solutions into activities 56 and output(s) 58. Activities 56 ensure the realization of the organization's strategy 44. SPI process 100 is an exemplary embodiment process in accordance with the present disclosure that can be used in business and industry, government, and nonprofit organizations using KPI's. SPI process 100 articulates and aligns operations, objectives 46, measures 48, and targets 50. Because of the source of inputs and the dispersal of outputs, SPI process 100 is preferably performed using a communication system including one or more controllers and a plurality of communication devices, such as wired or wirelessly connected computers, netbooks, notebook computers, tablets, PDA's, smart phones, and other devices that are capable of communication with other, similar devices. Such communication may be wired, such as through an Ethernet cable, or may be wireless, such as through Wi Fi or cellular communications. An exemplary embodiment of such a system capable of implementing SPI process 100 is described herein.

SPI process 100 begins with a start process 102, which initiates a strategic process to identify key aspects of an organization's strategy. Such identification may be provided through an exemplary management system and communicated through a server or controller. SPI process 100 moves from start process 102 to a consensus process 104. In consensus process 104, the organization's leadership or management begins building and gaining consensus on the organization's vision 42 and strategy 44 as a first step in using integrated model 40 as a framework for strategy implementation. Such consensus building may occur through a strategic initiative system that includes a management system, an initiative interface system, a communication system, and a server or controller. Control then passes from consensus process 104 to a translation process 106.

In translation process 106, leadership defines organizational objectives 46, which preferably occurs through a management system that is part of a strategic initiative system. Objectives 46 are what the organization must do to achieve strategic goals 72 and to make strategy 44 succeed. Objectives 46 identify what is critical to the future success of strategy 44. Each strategic objective 46 relates to a strategic goal 72, and there may be more than one strategic objective 46 related to each strategic goal 72. Objectives 46 are identified within four perspectives, financial perspective 22, internal business processes perspective 24, customer perspective 26, and learning and growth perspective 28. Leadership or management ranks strategic objectives 46 by their importance in achieving strategic goal(s) 72 according to the strategic priorities, described hereinabove. After organizational objectives 46 have been defined, control moves from translation process 106 to a measures and targets identification process 108.

Leadership across the organization translates objectives into performance measure(s) 48 in measures and targets identification process 108, which preferably are communicated through the strategic initiative system. Every performance measure 48 selected is preferably part of at least one cause-and-effect relationship that cumulates in improving business performance. Leadership also defines at least one target 50 in measures and targets identification process 108 that are the expected levels of performance or improvement required in the future. Once performance measure(s) 48 and target(s) 50 have been established, control moves from measures and identification process 108 to a strategic initiatives process 110.

Strategic initiatives 74 will deliver objectives 46 are identified by leadership or management in strategic initiatives process 110. In addition, leadership or management may verify alignment of strategic initiative 74 with one or more of vision 42, strategy 44, mission 68, core values 70, and strategic goals 72. Because there are likely to be a plurality of strategic initiatives 74 at any one time, leadership or management typically prioritize strategic initiatives 74 based on relative costs of inputs or resources 54 and activities 56, and the potential value and risk of output(s) 58 and outcome(s) 60. In some situations, leadership or management may also consider impact(s) 62 when prioritizing strategic initiatives 74. Each strategic initiative 74 is tool of an organization's strategy execution and typically requires cross-functional team support to succeed. Strategic initiative 74 consists of a collection of finite duration discretionary projects and initiatives that are designed to help the organization achieve its target performance. Strategic initiative 74 responds to an issue, challenge, problem, or situation, collectively "problem," that, when resolved, will have significant impact 62 on the organization's results, which may be financial results, market share, and/or other strategic indicators. For each strategic initiative 74, leadership or management defines situation statement 52 to communicate the relevance of strategic initiative 74, and establishes a baseline for comparison at a close of strategic initiative 74. Situation statement 52 includes a statement of the problem, including possible causes, symptoms, and possible or likely consequences if nothing is done to resolve the problem. Situation statement 52 may include actual or projected costs, a description of who is affected by the problem, and the importance of the problem to stakeholders. Each strategic initiative 74 is documented by recording a strategic initiative name or title and situation statement 52 into a template, such as a strategic initiative template 150 shown in FIG. 8. In addition, other aspects of each strategic initiative 74 may be documented in template 150, such as management allocated objectives 46, performance measures 48, and targets 50. Because of the complexity of obtaining information required to develop strategic initiatives 74, strategic initiatives process 110 is preferably conducted using the strategic initiative system, gathering information from an inventory system and communication through the management system. Once each strategic initiative 74 has been identified, aligned, and prioritized, control moves from strategic initiatives process 110 to an impact and external influences process 112.

While outcome(s) 60 are a direct result of activities 56 and output(s) 58, it is impact(s) 62 that is or are the desired result of each strategic initiative 74, because knowing the direction or heading of an organization is critical in picking the best route or path for an organization to use in accomplishing a corporate strategy. Impact(s) 62 are the ultimate end sought by each strategic initiative, frequently in alignment or synonymous with vision 42. Thus, one purpose of impact and external influences process 112 is to document the fundamental intended or unintended change or impact(s) 62 occurring within the organization, communities, or systems as a result of strategic initiative activities 56. Impact(s) 62 may also be recorded in template 150 of FIG. 8, which is preferably positioned as part of the strategic initiative system.

External influences 66, described hereinabove, may also be documented in this process and recorded in template 150. Leadership or management needs to take care in considering potential external influences because such influences can directly affect outcome(s) 60 and impact(s) 62, but can also be directly affected by outcome(s) 60 and impact(s) 62. Once desired impact(s) 62 and external influences 66 have been identified and document, control passes from impact and external influences process 112 to an outcomes process 114.

Results of strategic initiative 74 consist of outcome(s) 60 and impact(s) 62, both of which are described in outcomes process 114. Outcome(s) 60 and impact(s) 62 each appear in sequence over time. Outcome(s) 60 are earlier indicators of progress toward results. Outcome(s) 60 are the benefits, changes, or results anticipated to be derived from planned activities 56 and output(s) 58. Outcome(s) 60 answer the question of what happened as a result of strategic initiative 74 and what is useful in communicating impact(s) 62 of the investment in strategic initiative 74. In many cases, outcomes may be identifiable only through the resources and capabilities of the strategic initiative system, using various sources of inputs and computing capability of communication devices positioned as part of the strategic initiative system. Additionally, one or more servers or controllers may be the repository for information obtain from outcomes process 114. Short term outcome(s) 60 of strategic initiative 74 should be attainable within one to three years, intermediate term outcome(s) 60 should be achievable within four to six years, and long term outcome(s) 60 should be reflected in impact(s) 62 within about seven to ten years, as described hereinabove. Outcome(s) 60 and impact(s) 62 may be documented in template 150, described hereinabove. Once outcome(s) 60 and impact(s) 62 have been described and documented, control passes from outcomes process 114 to a strategies and assumptions process 116.

In strategies and assumptions process 116, leadership identifies effective organizational strategies 44 likely to contribute to the results, i.e., outcome(s) 60 and/or impact(s) 62. Organizational strategies 44 with less relative value may be discarded in favor of those with higher relative value. Leadership or management also records and documents assumptions 64 that support specified organization strategies 44. Both strategies 44 and assumptions 64 may be documented in strategic initiative template 150, preferably positioned as part of the strategic initiative system. Once organization strategies 44 and assumptions 64 have been documented, control passes from strategies and assumptions process 116 to an activities process 118.

Planned activities 56 are identified by leadership or management in activities process 118, including processes, tools, events, technology, and actions that are an intentional part of strategic initiative 74 implementation. Activities 56 are used to bring about outcome(s) 60 and impact(s) 62. To properly document and communicate planned activities, activities process 118 is preferably conducted at least partially in the strategic initiative system, using the various resources of the strategic initiative system. Once planned activities 56 are identified, they may be recorded in strategic initiative template 150, and control passes from activities process 118 to an inputs/resources process 120.

Inputs/resources 54 required and essential to make a strategic initiative scope of work or activities 56 operational are identified by leadership or management in inputs/resources process 120. Inputs/resources 54 include one or more human, financial, and organizational resources that strategic initiative 74 has available to direct toward activities 56. Examples of inputs/resources 54 include people, further including, workforce, management, and stakeholders, funds, facilities, knowledge, time, utilities, raw materials, finished materials, expendable supplies, transportation, etc. All or portions of inputs/resources 54 are identified in the strategic initiative system to better track the availability and expenditure of such resources, and to assure proper allocation of resources. Once inputs/resources 54 have been identified and recorded, for example in strategic initiative template 150, control passes from inputs/resources process 120 to an outputs process 122.

Output(s) 58 include one or more products, capital goods, and services that directly result from a strategic initiative intervention or development, and more specifically, from activities 56, and are identified by leadership or management in outputs process 122. Output(s) 58 may also include changes resulting from strategic initiative activities 56 that are relevant to the achievement of outcome(s) 60. Output(s) 58 measure planned activities 56 to show that activities 56 identified as necessary to achieve objectives 46 have been completed. Output(s) 58 are often described in terms of a size or scope of products, capital goods, and services delivered and produced by strategic initiative 74. In many cases, output(s) 58 may be identifiable only as data in the strategic initiative system, which makes the communication devices and controller or server of the strategic initiative system important to the success of SPI process 100. Once output(s)

58 have been identified and recorded, for example in strategic initiative template 150, control passes from outputs process 122 to an end process 124, which terminates SPI process 100.

Figure 7:
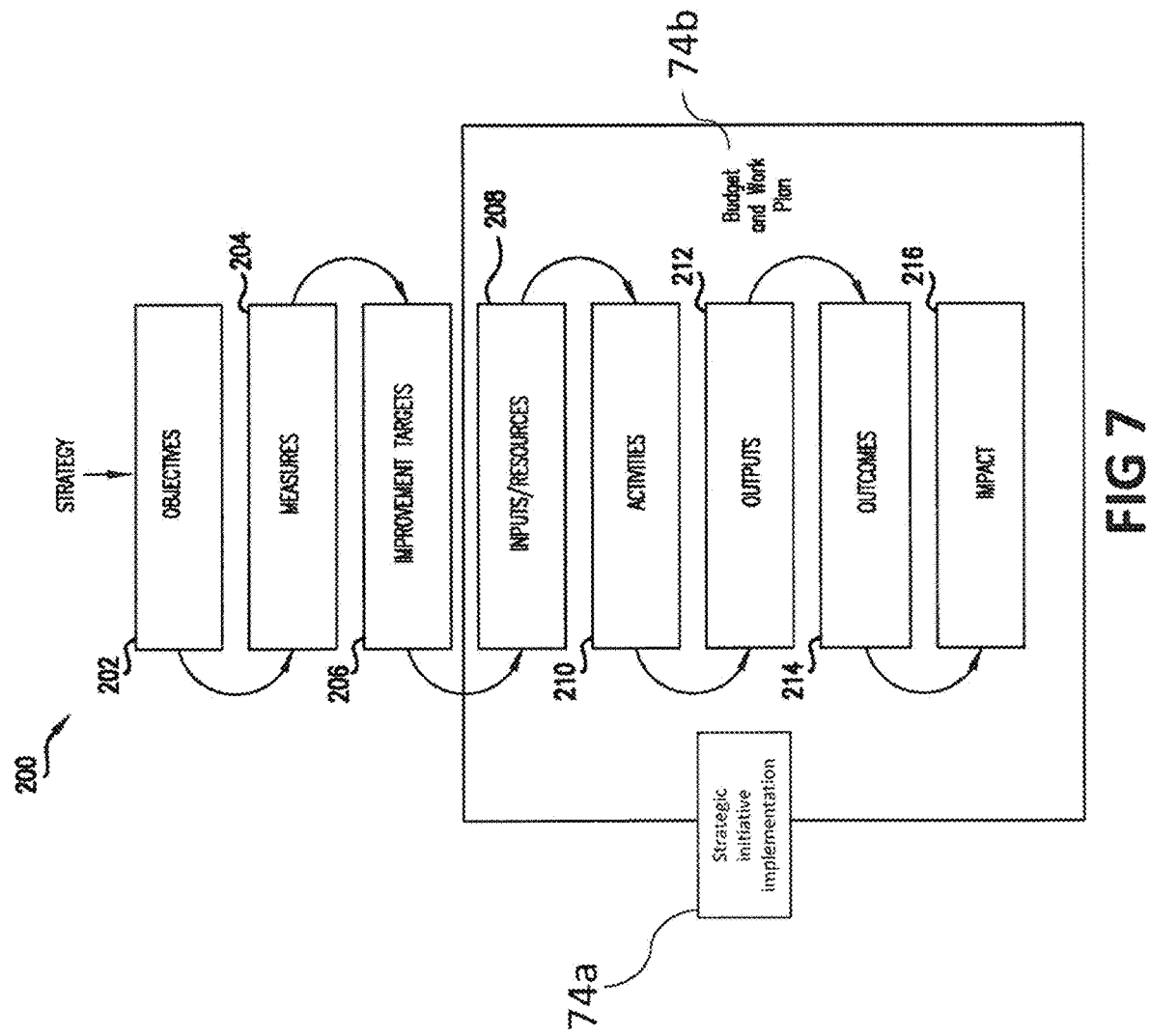
FIG. 7 is a process flow diagram of an integrated model as a strategic initiative management tool in accordance with an exemplary embodiment of the present disclosure.

Referring now to FIG. 7, integrated model 40 is shown as a strategic initiative management tool or management process, generally indicated at 200. Management tool 200 is similar in many respects to integrated model 40, except certain portions of integrated model 40 are unnecessary for implementation of strategic initiative 74, and those portions are eliminated to transition from integrated model 40 to management tool 200. Generally, each of the elements of management tool 200 is identified by leadership or management, and may be considered process steps. Furthermore, because of the complexity of modern organizations, it is preferable that management tool be implemented in a communication system that includes one or more inter-connected (either by wire or wirelessly) computers, tablets, smart phones, etc., with inputs coming from one or more sources that may be geographically remote, data storage and analysis performed in one or more controllers, servers, etc., and communication provided by the system, conveying information contained in data storage or from the analysis. Management tool 200 begins with an objectives process 202, where leadership or management identifies essential objectives 46 that must be met to achieve an organization's strategy 44. Next, in a measures process 204 measures 48 are identified that define success in attainment of objectives 46. Following identification of measures 48, management or leadership identify improvement targets 50 in a targets process 206 that show how far and how fast strategic initiative 74 needs to go or extend in order to attain objectives 46. Next, management or leadership starts a new phase of a strategic initiative implementation 80 that involves specification of a budget and work plan 82. In this phase, management or leadership identifies inputs/resources 54 that include available resources to make the scope of work for strategic initiative 74 operational and essential for activities 56 to occur in an inputs/resources process 208. From definition of inputs/resources 54, management tool 200 moves to an activities process 210 where activities 56 are defined that includes, for example, the processes, tools, events, technology, and actions that are an intentional part of strategic initiative 74 implementation. After activities 56 are defined, output(s) 58 are defined in an outputs process 212. Output(s) 58 may include, for example, products, capital goods, and services those results from activities 56. Short term, intermediate term, and long term outcome(s) 60 are then defined in an outcomes process 214. Outcome(s) 60 includes observable behavioral, institutional, and societal changes. Lastly, impact(s) 62 are defined or described in an impact process 216. Impact(s) 62 can include the fundamental intended or unintended change(s) occurring in organizations, communities, or systems as a result of strategic initiative 74.

Figure 8:
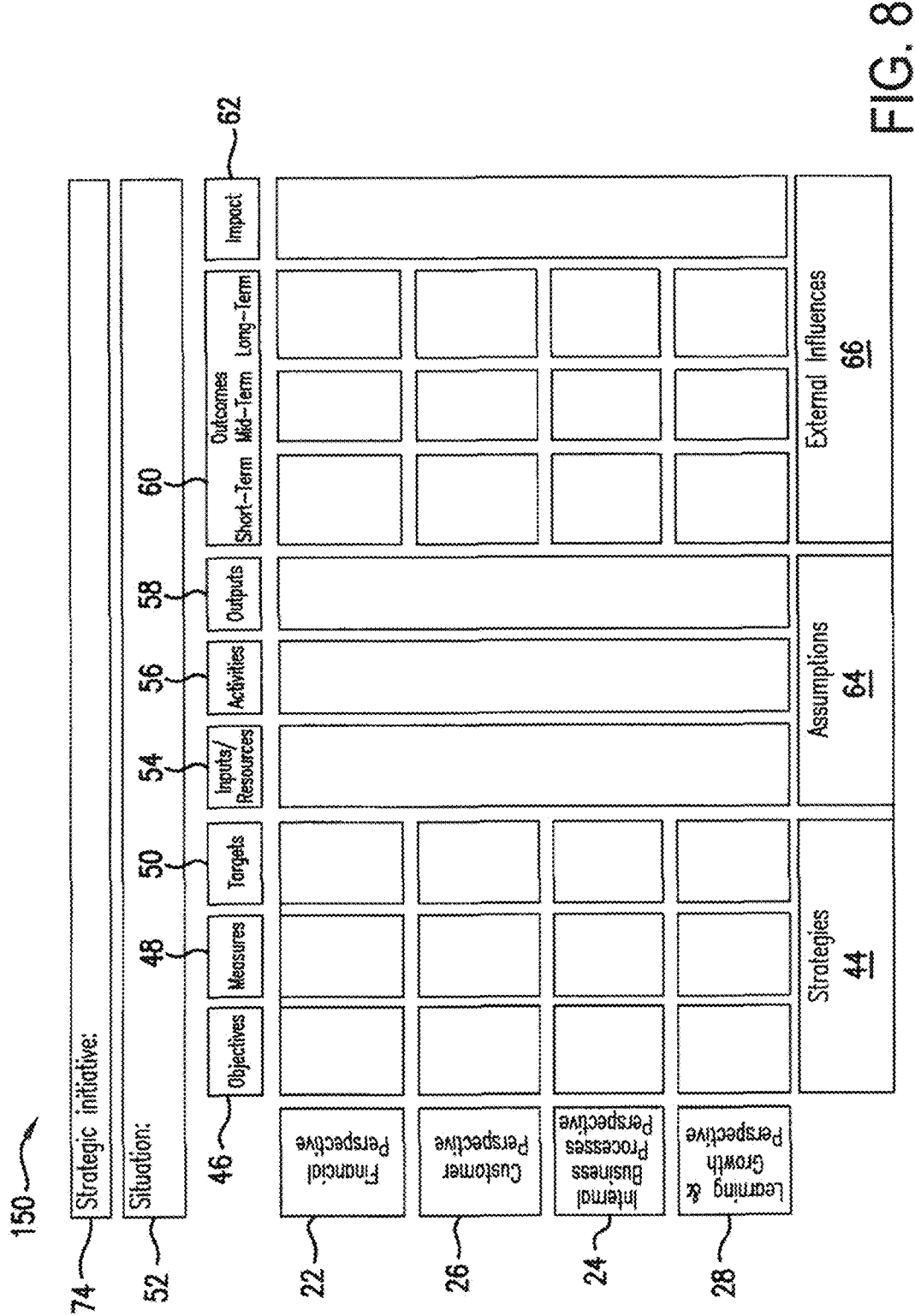
FIG. 8 is an integrated model template in accordance with an exemplary embodiment of the present disclosure.

Referring now to FIG. 8, strategic initiative template 150, which is a template for integrated model 40, is shown. Template 150 includes cause-and-effect or causal relationships between allocated objectives 46, measures 48, and targets 50 within the four key perspectives of conventional balanced scorecard 20: financial perspective 22, internal business processes perspective 24, customer perspective 26, and learning and growth perspective 28; and inputs/resources 54, activities 56, outputs 58, outcomes 60, and at least one impact 62, similar to these elements of logic model 30. In addition, template 150 records strategies 44, assumptions 64, and external influences 66. Integrated model 40 is a versatile tool that can support many strategic management activities including, for example, planning, communications, consensus building, performance management, initiative management, learning and fundraising.

Integrated model 40 may be used as a strategic planning tool for business, government, and nonprofit organizations. Integrated model 40 provides a framework for articulating and aligning operations, goals 72, and measures 48. Integrated model 40 also defines the fundamental intended or unintended change occurring in organizations as a result of strategic initiative 74 activities 56. Integrated model 40 clarifies and translates an organization vision 42 and strategy 44, sets target(s) 50, aligns strategic initiative(s) 74, and helps leadership and/or management move from a reactive mode of operation to a proactive mode of operation.

Integrated model 40 is a valuable planning and development tool for strategic initiatives 74. Integrated model 40 provides a visual representation that describes and shares an understanding of relationships among strategic planning elements and the element necessary to operate strategic initiatives 74 and programs. Integrated model 40 describes a bounded strategic initiative 74, both what is planned, i.e., the doing, and the results expected present linkages between the four key perspectives, financial perspective 22, internal business processes perspective 24, customer perspective 26, and learning and growth perspective 28. Integrated model 40 defines require inputs/resources 54 to make the scope of work of strategic initiative 74 operational, and defines required activities 56 to implement strategic initiative 74, e.g., actions, processes, events, services, products, technologies, or other elements. Integrated model 40 defines output(s) 58, e.g., anticipated products, services, or events, which will be delivered through the accomplishment of planned activities 56. In addition, integrated model 40 identifies outcome(s) 60, e.g., benefits, changes or results, which are derived from activities 56 and output(s) 58, providing a clear understanding of the structure and objectives of strategic initiatives 74 and a rationale underpinning the deployment of strategic initiatives 74. A comparison of the capabilities and benefits of balanced scorecard 20, logic model 30, and integrated model 40 as a planning tool is provided in Table 3 below.

TABLE 3

Integrated Model as a Planning Tool

| Capabilities, Usage & Benefit | Balanced Scorecard | Logic Model | Integrated Model |
|---|---|---|---|
| Plans, sets targets 50, and aligns strategic initiatives 74. | X | | X |
| Serves as planning tools by providing a framework for articulating and aligning goals 72, objective(s) 46, activities 56, performance measure(s) 48, and impact(s) 62. | | | X |
| Serves as a foundation for developing a strategic plan. | X | X | X |
| Brings strategic initiative 74 concepts and dreams to life and allows stakeholders to try an idea and apply theories to model or picture how strategic initiative 74 would function. | | X | X |
| Helps to gain a common understanding of how a strategic initiative 74 would work and the responsibilities (workforce, management, etc.) to make it work. | | X | X |

TABLE 3-continued

Integrated Model as a Planning Tool

| Capabilities, Usage & Benefit | Balanced Scorecard | Logic Model | Integrated Model |
|---|---|---|---|
| Provides stakeholders with a road map describing the sequence of related events connecting the need for planned strategic initiative 74 with desired outcome(s) 60. | | X | X |

A well-built integrated model 40 is a powerful workforce communication tool. Integrated model 40 can show stakeholders at a glance what a strategic initiative 74 is doing, i.e., activities 56, and what it is achieving, i.e., outcome(s) 60, emphasizing the link between the two. Integrated model 40 provides a common understanding of how strategic initiative 74 works and staff responsibilities to make it work, and offers a systematic way of portraying the breadth of relationships involved in complex systems of causally related actions. Integrated model 40 helps stakeholders visualize and understand how human and financial investments can contribute to achieving intended strategic initiative 74 results and provides stakeholders with a road map describing the sequence of related events connecting the need for the planned strategic initiative 74 with the desired results of strategic initiative 74. Integrated model 40 builds common understanding and promotes buy-in among both internal and external stakeholders about what strategic initiative 74 is, how strategic initiative 74 works, and what strategic initiative 74 is trying to achieve. Integrated model 40 facilitates communications of corporate objectives 46 to all levels within the organization, and serves as a means of communicating with internal and external audiences. Integrated model 40 communicates strategic objectives 46 and performance measures 48, and improves communication between stakeholders. In addition, integrated model 40 communicates strategic initiative 74 to people outside strategic initiative 74 in a concise and compelling way, and illustrates the presumed effects of implementing strategies 44. A comparison of the capabilities and benefits of balanced scorecard 20, logic model 30, and integrated model 40 as a communication tool is provided in Table 4 below.

TABLE 4

Integrated Model as a Communication Tool

| Capabilities, Usage & Benefit | Balanced Scorecard | Logic Model | Integrated Model |
|---|---|---|---|
| Communicates and links strategic objectives 46 and measures 48. | X | | X |
| Provides top down reflection of the organization's mission 68, vision 42, strategy 44, and a strategic initiative 74 outcome(s) 60 and impact(s) 62. | | | X |
| Facilitates communication of corporate objective(s) 46 to all levels. | X | | X |
| Serves as a means of communicating with internal and external audiences. | X | X | X |
| Communicates strategic initiative 74 to people outside strategic initiative 74 in a concise and compelling way. | | X | X |
| Serves as a workforce communication tool. | X | X | X |
| Communicates strategic objective(s) 46, performance measure(s) 48 to all levels as well as strategic initiative(s) 74 and impact(s) 62. | | | X |
| Improves communication between stakeholders. | X | X | X |

Integrated model 40 serves as a visual performance management framework (PMF) that enables a holistic and pervasive operational performance management across an entire business. The framework gives managers and executives, i.e., leadership or management, a multi-view of organizational performance to enable an organization to clarify and plan its strategy implementation from different perspectives and create future value by concretizing or solidifying the metrics and actions necessary for this vision to come true. Integrated model 40 provides a fully deployed model that cascades from top levels of the organization down to the lowest ranks. Integrated model 40 aligns organization performance measures 48 with strategic initiatives 74 and provides an indication of future results through outcome(s) 60 and impact(s) 62. Integrated model 40 provides a diagnostic tool to monitor performance measures 48 including financial perspectives 22, internal business processes perspective 24, customer perspective 26, and learning and growth perspective 28. Integrated model 40 provides a foundation for an incentive compensation plan that ties employees' performance metrics in a direct way to an overall strategic initiative 74 implementation performance. Using integrated model 40, organizations can create a true culture of visibility, accountability, and performance enhancement. Integrated model 40 provides a fully deployed model that cascades from top levels of the organization down to the lowest ranks. A comparison of the capabilities and benefits of balanced scorecard 20, logic model 30, and integrated model 40 as a performance management framework is provided in Table 5 below.

TABLE 5

Integrated Model as a Performance Management Framework

| Capabilities, Usage & Benefit | Balanced Scorecard | Logic Model | Integrated Model |
|---|---|---|---|
| Provides measures 48 derived from the strategy 44 that represents a balance between external and internal measures. | X | | X |
| Provides a foundation for incentive compensation plans. | X | | X |
| Monitors performance with financial and non-financial measures. | X | | X |
| Provides an indication of future results. | X | X | X |
| Serves as a strategic framework for proactively managing performance. | X | | X |
| Clarifies and translates vision 42, goals 72, and strategy 44 into activities 56. | | | X |
| Develops objectives 46, measures 48, and targets 50 for an organization's financial perspective 22, and links financial perspective 22 to strategic initiative 74 outcome(s) 60 and impact(s) 62. | | | X |

TABLE 5-continued

Integrated Model as a Performance Management Framework

| Capabilities, Usage & Benefit | Balanced Scorecard | Logic Model | Integrated Model |
|---|---|---|---|
| Develops objectives 46, measures 48, and targets 50 for an organization's customer perspective 26, and links customer perspective 26 to strategic initiative 74 outcome(s) 60 and impact(s) 62. | | | X |
| Develops objectives 46, measures 48, and targets 50 for an organization's internal business processes perspective 24, and links internal business processes perspective 24 to strategic initiative 74 outcome(s) 60 and impact(s) 62. | | X | X |
| Develops objectives 46, measures 48, and targets 50 for an organization's learning and growth perspective 28, and links learning and growth perspective 28 to strategic initiative 74 outcome(s) 60 and impact(s) 62. | | | X |

Integrated model 40 further serves as a strategic initiative 74 management tool because it connects the dots between situation 52, objective(s) 46, measure(s) 48, target(s) 50, inputs/resources 54, activities 56, output(s) 58, outcome(s) 60, and impact(s) 62. Integrated model 40 can be a basis for developing a more detailed management plan, as depicted in FIG. 7. Using data collection and an evaluation plan, integrated model 40 helps leadership or management to track and monitor operations to better manage results. Integrated model 40 can serve as the foundation for creating budgets and work plans as depicted in FIG. 7. Leaders of strategic initiative(s) 74 need to have a working knowledge of financial perspective 22, internal business processes perspective 24, customer perspective 26, and learning and growth perspective 28 with respect to value propositions because organizations often charter strategic initiatives 74 to close a gap or create an advantage with respect to value propositions. Value propositions broadly include benefits from activities 56, which may include output(s) 58, outcome(s) 60, and impact(s) 62. Integrated model 40 defines strategic objectives 46 of financial perspective 22, internal business processes perspective 24, customer perspective 26, and learning and growth perspective 28 with respect to value propositions as depicted in template 150 of FIG. 8.

Integrated model 40 may also be used as a learning tool. Integrated model 40 enhances a strategic feedback and learning process, providing a learning diagnostic tool to define, predict, and monitor workforce learning performance measures. Integrated model 40 serves as a workforce learning tool that enhances learning through an iterative exchange of information and experience by providing strong visual representation and graphics, for example FIGS. 4, 5, 7 and 8, that are proven as effective learning instruments. A comparison of the capabilities and benefits of balanced scorecard 20, logic model 30, and integrated model 40 as a learning tool is provided in Table 6 below.

TABLE 6

Integrated Model as a Learning Tool

| Capabilities, Usage & Benefit | Balanced Scorecard | Logic Model | Integrated Model |
|---|---|---|---|
| Enhances learning through an iterative exchange of information and experience, providing valuable documentation or evidence. | | X | X |
| Enhances strategic feedback and learning. | X | | X |
| Helps stakeholders visualize and understand how human and financial investments contributed to achieving intended strategic initiative 74 goals and how such investments can lead to strategic initiative 74 improvements. | | X | X |
| Provides a learning diagnostic tool to monitor learning performance measures. | X | | X |
| Serves as a workforce learning tool. | X | X | X |
| Enhances learning through an iterative exchange of information and experience, providing valuable documentation or evidence. | | X | X |
| Provides strong visual representation of cause-and-effect (causal) relationships graphics, which are proven as effective learning instruments, between the four key perspectives, financial, customer, business processes, and learning and growth, and strategic initiative 74 inputs/resources 54, activities 56, output(s) 58, outcome(s) 60, and desired impact(s) 62 | | | X |
| Enhances the learning process through evaluation. | | X | X |
| Serves as an evaluation tool for strategic initiative(s) 74 and policies as part of an evaluation framework. | | X | X |
| Illustrates the presumed effects of implementing strategies 44 described in the strategic plan, such as that shown in FIGS. 4 and 5. | | X | X |
| Helps to design new strategic initiative(s) 74 or to confirm that an existing strategic initiative 74 design is still reasonable under current circumstances. | | X | X |
| Provides a common understanding of how strategic initiative 74 works and workforce, leadership, and/or management, collectively, staff, responsibilities to make it work. | | X | X |
| Provides a visual way to present and share the understanding of the relationships among vision 42 and inputs/resources 54 required to operate a strategic initiative 74, activities 56, and output(s) 58, outcome(s) 60, and impact(s) 62, collectively, changes or results, desired to be achieved. | | | X |
| Illustrates the presumed effects of implementing strategic initiative(s) 74. | | X | X |
| Offers a systematic way of portraying the breadth of relationships involved in complex systems and the effects of causally related actions. | | X | X |
| Helps stakeholders to visualize and understand how human and financial investments can contribute to achieving intended strategic initiative 74 goals. | | X | X |

TABLE 6-continued

Integrated Model as a Learning Tool

| Capabilities, Usage & Benefit | Balanced Scorecard | Logic Model | Integrated Model |
|---|---|---|---|
| Provides stakeholders with a road map describing a sequence of related events connecting the need for planned strategic initiative 74 with the desired result(s) of strategic initiative 74. | | X | X |

A sound integrated model 40 demonstrates to funders that an organization has purposefully identified what a strategic initiative 74 will accomplish, what strategic initiative 74 is intended to achieve, and inputs/resources 54 needed to accomplish activities 56. Integrated model 40 can also help structure and streamline grant writing. Integrated model 40 provides a diagram that describes strategy 44 and the logically related parts of strategic initiative 74, showing links between audience needs, activities 56 and outcome(s) 60, and how outcome(s) 60 will be measured and evaluated.

Figure 9:
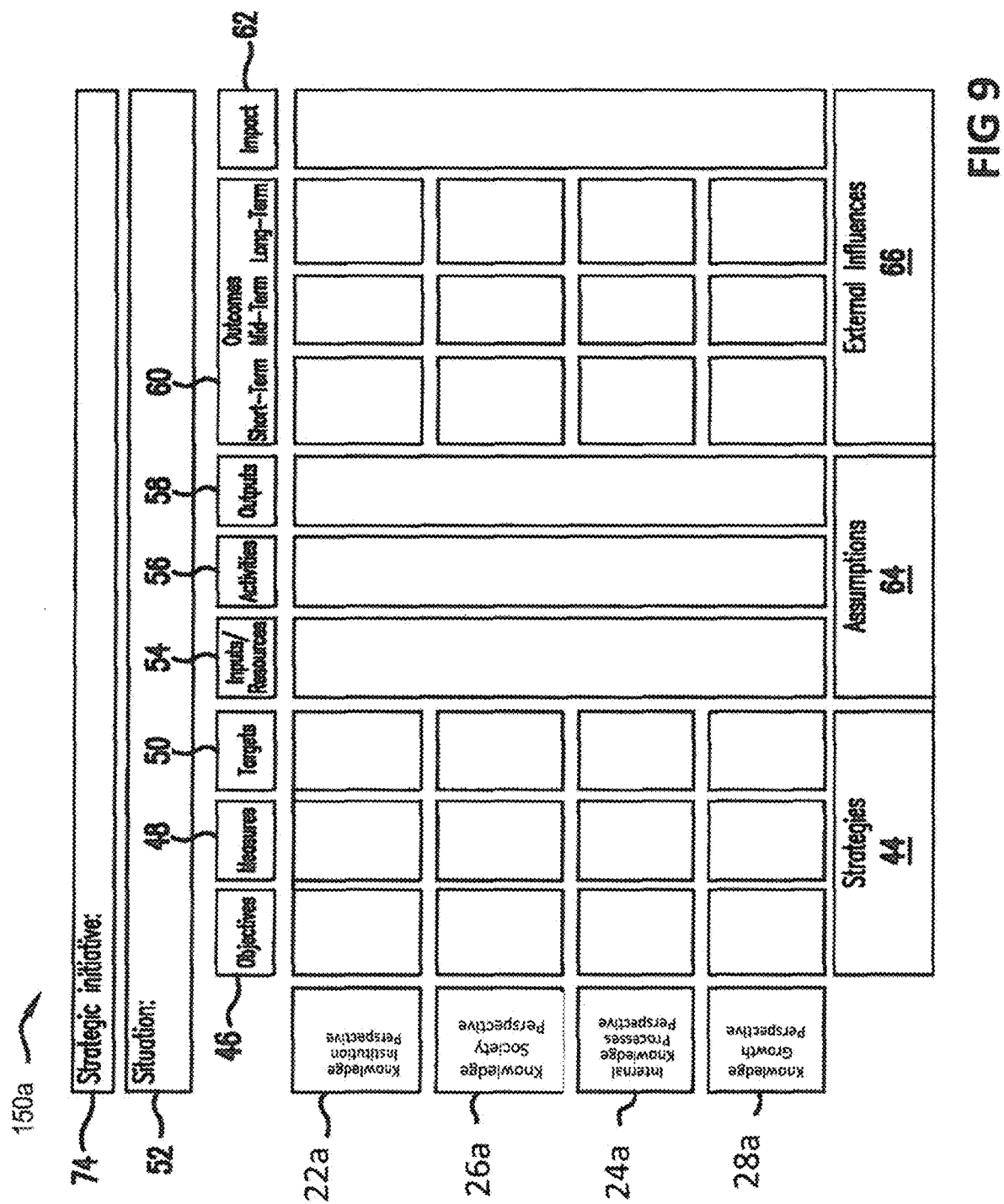
FIG. 9 is an embodiment of FIG. 8 more appropriate for application in knowledge based economies.

While the strategic initiative template 150 of FIG. 8 is a template for the integrated model 40 using conventional balanced scorecard 20, strategic initiative template 150a of FIG. 9 includes cause-and-effect or causal relationships between allocated objectives 46, measures 48, and targets 50 within the four key perspectives of Reyada balanced scorecard 20a of FIG. 2: knowledge institutional perspective 22a, internal knowledge processes perspective 24a, societal perspective 26a, and growth perspective 28a.

The use of the strategic initiative template 150a in the case of not-for-profit institutions, such as public higher education bodies, is more appropriate than trying to bend the rules of application of conventional balanced scorecard 20; intended for tracking profitability, to fit situations wherein profits are believed to be trackless. Assigning explicit and succinct dimensions relevant to knowledge and public service to strategic management tools is more straightforward and apt to be more beneficent; especially in the case of knowledge-dispensing institutions, than indulgence into forceful attempts to interpret standard monetary dimensions, such as financial and shareholders perspectives. In other words, there is no need to stick to a situational balanced scorecard model but rather use it to set the framework for situation-aware models appropriate for the age of knowledge. Being a generic organism, Reyada balanced scorecard 20a concept can be used to generate models for tracking the performance of higher education entities and research institutions whether or not their economic health and competitive edge are sensitive to performance. In fact, several balanced scorecards 20a need to be generated for a single higher education entity, regardless of the type of resources, one for the whole organization and one of each of the comprising units due to the intrinsic differences between strategic management of an institution as a whole body and that of the comprising members or constituents.

Figure 10:
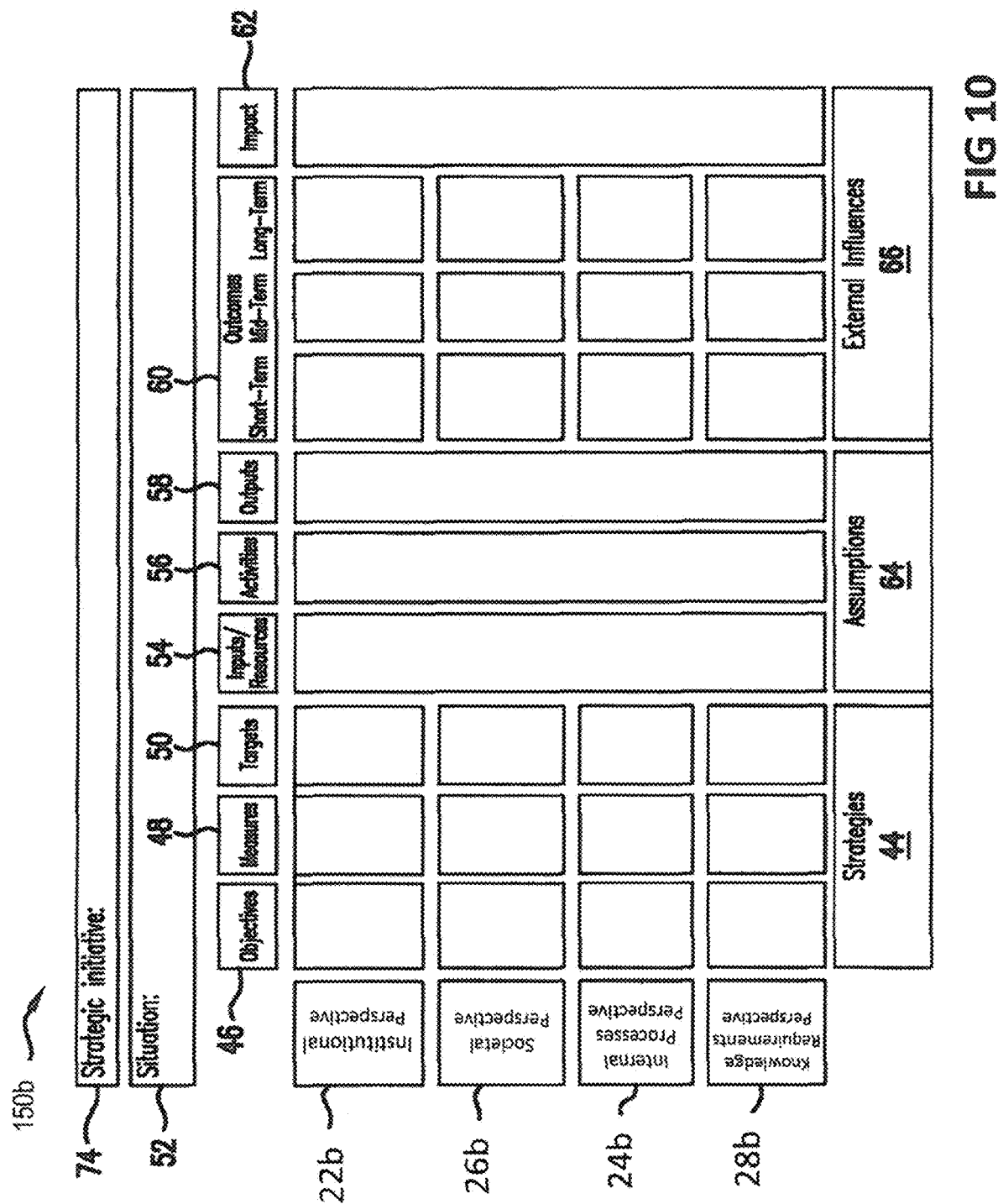
FIG. 10 is an adaptation of the embodiment of FIG. 9 in a University application.

For a specific situation, the case of a university, a strategic initiative template 150b was derived in FIG. 10, taking into account the fact that university performance has no or negligible impact on finance since revenue is affected only by budgetary and policy variables, including those of the government, which may be local, regional, or national. Even stakeholders' satisfaction is of little consequence, since increased student population poses a burden rather financial benefit. Strategic initiative template 150b is applicable to educational institutions characterized by fixed resources and growth rate dictated by national needs and budgetary constraints. This case is common for many government supported universities, municipality colleges and schools of high learning. Free education and government sponsored research equitable between national colleges on the same level dismisses performance as raisons d'être for financial health or economic viability.

Figure 11:
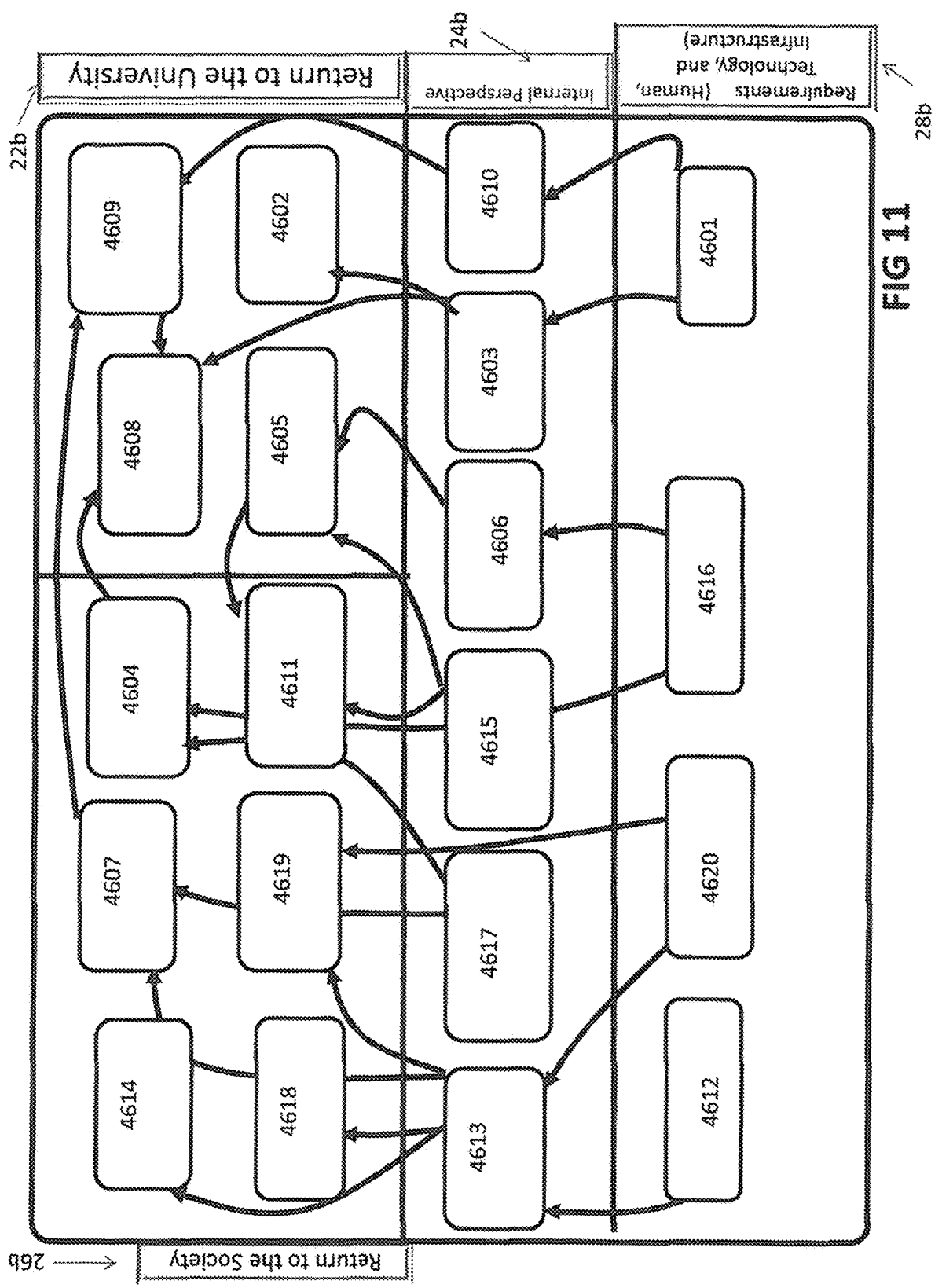
FIG. 11 is the distribution of objectives among the dimensions of the model in FIG. 10.

In the case of the example, which will be for a fictional KA University, there are twenty strategic objectives 46. Those objectives are interrelated and are allocated in FIG. 11 to the four perspectives: a return to the University perspective 22b, an internal processes perspective 24b, a return to society perspective 26b, and a knowledge requirements (human, technology and infrastructure) perspective 28b.

Return to the University perspective 22b involves four objectives: realizing quality standards according to international classification in a University electronic portal 4602; the University ranks first in scientific research on the level of the Arabic World per an approved international classifications 4605; Size of yearly internal resources is twice a current resources 4608 and an acquisition of the largest number of consulting contracts 4609.

Internal processes perspective 24b, involves six objectives: development & offering 80% of the University curricula through an e-learning 4603; an approval of 50 Doctoral programs and all Departments offer Master Degrees 4606; a registration of the largest number of gifted students & innovators in the business incubators' program 4610; an actual implementation of courses content approved in the curricula 4613; a having implemented programs for each collaboration agreement 4615; a qualifying freshman students who meet the requirements and provision of alternative programs for those who do not meet those requirements 4617.

Return to the society perspective 26b, involves six objectives: a number of distant learning students reaches sixty thousands (60,000) 4604; a building societal trust and content so that the University will be the first choice 4607; a top University in its geographic region in transfer, localization, and development of technology 4611; an international academic accreditation for 75% of the programs 4614; a getting local & international accreditation 4618; and a graduates include 5% education leaders, 1% Social leaders, 2% entrepreneurs 4619.

Knowledge requirements (human, technology and infrastructure) perspective 28b involves four objectives: an integrated implementation of electronic communication within all University units 4601; a meeting requirements for academic accreditation of all programs 4612; an availability of success elements and effective performance of the infrastructure in all University units 4616; and a qualify two faculty members in each college to follow selection and development of future leaders 4620.

Measures 48 associated with each objective 46 are either explicitly indicated in the objective or separately specified. Each objective will have at least one measure. Table 7 lists measures 48 associated with objectives 46 for each strategy initiative 74.

TABLE 7

Measures 48 associated with Objectives 46

| Strategic Initiative 74 | Objectives 46 | Measures 48 |
|---|---|---|
| Development of electronic communication | 4601 | Completion of the readiness of the University units to transfer to electronic communication 48011<br>Reengineering of all communication systems of all University units 48012<br>Availability of the required programs and technical preparations 48013 |
| Development of the University portal | 4602 | the quality standards of the international classification of the electronic portals of the universities 4802 |
| Distance learning and e-learning | 4603 | 80% of the University Curricula 4803 |
|  | 4604 | 60,000 enrollees 4804 |
| Academic Accreditation of the Institution and Programs | 4612 | accreditation requirements in all programs and academic units 4812 |
|  | 4613 | all University curricula meets international standards 4813 |
|  | 4614 | accreditation for 75% of the University programs and at least for 100 scientific programs 4814 |
|  | 4615 | Local and International Institutional accreditation of the University 4815 |
| Qualifying of students for university education | 4617 | Orientation and qualification of freshman student of the University and fulfillment of the requirements of the preparatory year in addition to provision of alternative programs for those students who cannot complete the required preparation 4817 |
| Raising the standards of graduate studies | 4606 | Approve 50 doctorate programs 48061<br>All University departments provide Master degrees 48062<br>Graduate students represent 20% of the total of full time students enrolled in the University 48063<br>Each department has at least one faculty member in with international record to supervise a graduate program 48064 |
| Development of Scientific Research | 4605 | Each member of the faculty has at least one scientific product (including scientific papers, translation, books) 48051<br>All University departments provide Master degrees 48052<br>Graduate students represent 20% of the total of full time students enrolled in the University 48053<br>Each department has at least one faculty member with international record to supervise a graduate program 48054<br>Publication of 50% of the scientific members authored by members of the faculty in periodicals and scientific journals which meet the standards of the ISI that publishes a list of highly cited researchers 48055<br>Each college organizes yearly one conference or symposium in its field 48056 |
| Development of University Resources | 4608 | volume of University-generated resources is twice then current volume 4808 |
|  | 4609 | volume of University-generated resources is twice then current volume 4809 |
| Nurturing the gifted and innovator students | 4610 | Registration of the largest number of gifted students and innovators in the business incubators 4810 |
|  | 4619 | 5% University graduate qualify to become education leaders 48191<br>1% University graduate qualify to become society leaders 48192<br>2% University graduate qualify to become business entrepreneurs 48193 |
|  | 4620 | Qualifying two faculty members; at least, in each college to follow up with the selection and development of future leadership 4820 |

TABLE 7-continued

Measures 48 associated with Objectives 46

| Strategic Initiative 74 | Objectives 46 | Measures 48 |
|---|---|---|
| Preparation of future leaders | 4610 | Registration of the largest number of gifted students and innovators in the business incubators 4810 |
|  | 4619 | 5% University graduate qualify to become education leaders 48191<br>1% University graduate qualify to become society leaders 48192<br>2% University graduate qualify to become business entrepreneurs 48193 |
|  | 4620 | Qualifying two faculty members; at least, in each college to follow up with the selection and development of future leadership 4820 |
| Development of collaborative work | 4615 | Each agreement for collaboration is in harmony with the strategic plan of the University and the various areas of distinction 4815 |
| Media outreach and promotion of mental image | 4607 | KA University becomes the university of choice; according to the University media outreach plan 4807 |
| Development of the business and knowledge system | 4611 | The University ranks the first among the universities of its geographic region in the development of programs for technology transfer, localization and advancements in the areas of the University distinction 4811 |
|  | 4616 | Completion of the laboratories, testing facilities and information networks and systems in all the University units 48161<br>Availability of scientific and technical cadres required to operate and maintain such infrastructure 48162<br>Continuous modernization and development of such infrastructure according to approved standards 48163<br>ISO certification of the international quality of University laboratories and testing facilities specializing in evaluation and approval of the results obtained from such laboratories and testing facilities 48164 |

Targets 50 are associated with objectives 46 and accordingly there are twenty (20) targets to be aimed at. For each target 50 there are strategies 44 to achieve said target. Table 8 lists targets 50 and corresponding strategies 44.

TABLE 8

Targets 50 and Strategies 44 associated with Objectives 46

| Objectives 46 | Targets 50 | Strategies 44 |
|---|---|---|
| 4601 | Completing the university e-readiness to go through the electronic administration 50011<br>Systems reengineering in all university sectors 50012<br>Availability of necessary programs and technical equipment 50013 | Enhancing and developing partnerships to establish a suitable university environment for electronic administration development 4401 |

TABLE 8-continued

Targets 50 and Strategies 44 associated with Objectives 46

| Objectives 46 | Targets 50 | Strategies 44 |
|---|---|---|
| 4602 | Providing the electronic university gate with the quality standards endorsed in the international classifications of universities electronic sites 5002 | Providing the classification requirements including the equipment, experiences and efficiencies among the electronic gate in a scientific and attractive way, to assert the university credibility and enhance the trust of authorities responsible for classification 4402 |
| 4603 | Using 80% of the university curricula in electronic education 5003 | To provide an environment suitable for distance learning including Faculty members and technicians, and such environment will attract the concerned classes of community 5003 |
| 4604 | To increase the number of distance learning programs students to 50,000 students 5004 | 5003 |
| 4605 | At least one scientific publication for each one of the faculty members yearly (e.g. scientific papers - translation- book copyrighting & publication) 50051 | |
| | Publishing at least 50% of papers by the faculty members in the classified scientific journals(ISI) 50052 | |
| | Each faculty to organize a scientific forum or conference each year in its major specialty 50053 | |
| 4606 | All university departments grant the Master degree 50061 | Strategic partnerships with the scientific and research institutions to contribute to the scientific climate and infrastructure 4406 |
| | The post-graduate studies students represent 20% of the total enrollment 50062 | |
| | At least there is one member of staff in each department having an international record related to post-graduate studies programs supervision 50063 | |
| 4607 | Building the community trust and persuasion in order that the university will be the first option according to its media communication plan 5007 | Building an attractive media communication with all authorities inside and outside the university to enhance trust in the university and its fundamental role 4407 |
| 4608 | The university annual self-resources volume should become twice double the current amount 5008 | Private sector discipline and work 44081 Knowledge and discipline & adherence to apply rules and regulations of private sector 44082 |
| 4609 | The university should obtain the biggest number of the consultation contracts signed with all Saudi Universities, at least three fold of present quota 5009 | 44081 44082 |
| 4610 | Registering many talented and inventors under the programs of enterprises guarded by the university all over the university 5010 | Developing the local and international strategic partnerships which support the university environment, encourages inventors and distinguished people 4410 |
| 4611 | First university in its geographic region in developing, technology transfer and adaptation programs 5511 | Enhancing the university credibility as a research university in its strategic visions, programs, resources, capabilities and partnerships 4411 |
| 4612 | Providing academic requirement accreditation in all academic programs and units 5012 | Providing scientific, technical, technological and organizational environment for academic and institutional accreditation in all the academic programs and strategic units 4412 |
| 4613 | Actual application of the curricula and courses included in the approved academic plans, developing them in a manner contributing to upgrading educational operation according to international criteria, and fulfill the community needs, and at least the academic accreditation criteria regarding all university curricula 5013 | |
| 4614 | Obtaining the international academic accreditation for 75% of the university programs, at least for 100 academic programs 5014 | 4412 |
| 4615 | Each collaboration agreement will contain activated programs consistent with the university strategic plan and its excellence fields 5015 | Clear vision about the excellence points of the partners commensurate with the university strategic plan in addition to providing an attractive environment to expand and invest these points 4411 |
| 4616 | Availability of success elements and efficient performance of infrastructure in all the university units through improving labs and information system and networking in all sectors 50161 | |
| | Availability of necessary scientific and technical cadres to operate and maintain the above-mentioned elements 50162 | |
| | Continuous upgrading and development for these elements according to the approved criteria 50163 | |
| | All central labs obtain relevant ISO certificates 50164 | |
| 4617 | The qualification of the student of preparatory year to enable them to pass requirements in addition to providing substitute programs for students who do not meet the preparatory year requirements 5017 | Adopting suitable scientific climate, attractive academic programs and cultural environment good for academic study 4417 |
| | Adopting suitable scientific climate, attractive academic programs and cultural environment good for academic study 5018 | 4412 |
| 4619 | Qualification of at least 5% of the university graduates to become educational leaders 50191 | 4410 |

TABLE 8-continued

Targets 50 and Strategies 44 associated with Objectives 46

| Objectives 46 | Targets 50 | Strategies 44 |
|---|---|---|
| | Qualification of at least 1% of the university graduates to become community leaders 50192 | |
| | Qualification of at least 2% of the university graduates to become entrepreneurs 50193 | |
| 4620 | Qualify two faculty members in each college to follow selection and development of future leaders 5020 | Qualification of the faculty members (at least) in each college to follow up choosing and developing the future leaders 4420 |

Figure 12:
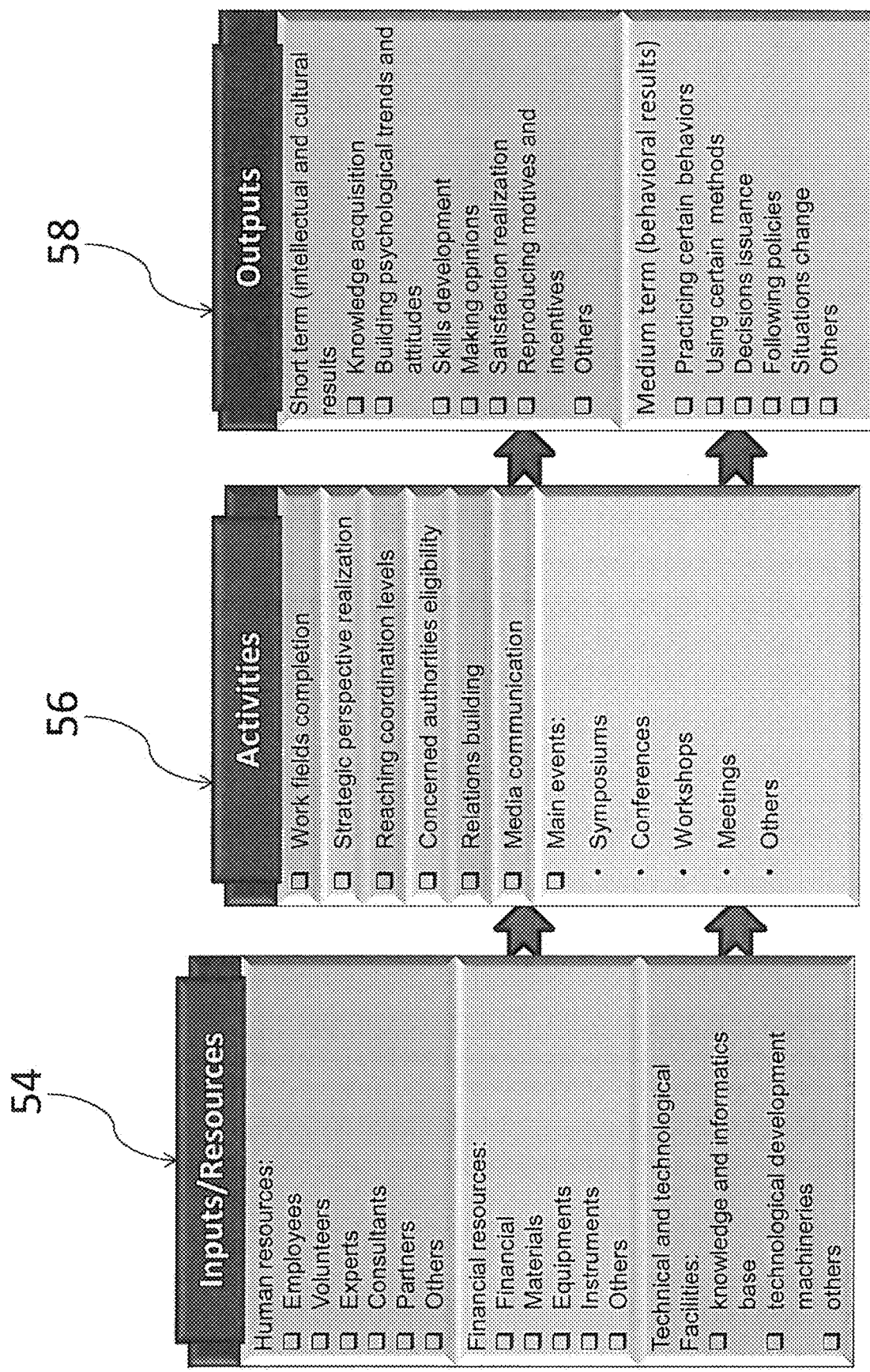
FIG. 12 is a representation of an example of the relationship of resources and activities.

An example of inputs/resources 54, activities 56 and outputs 58 is shown in FIG. 12 for the case of KA University.

Figure 13:
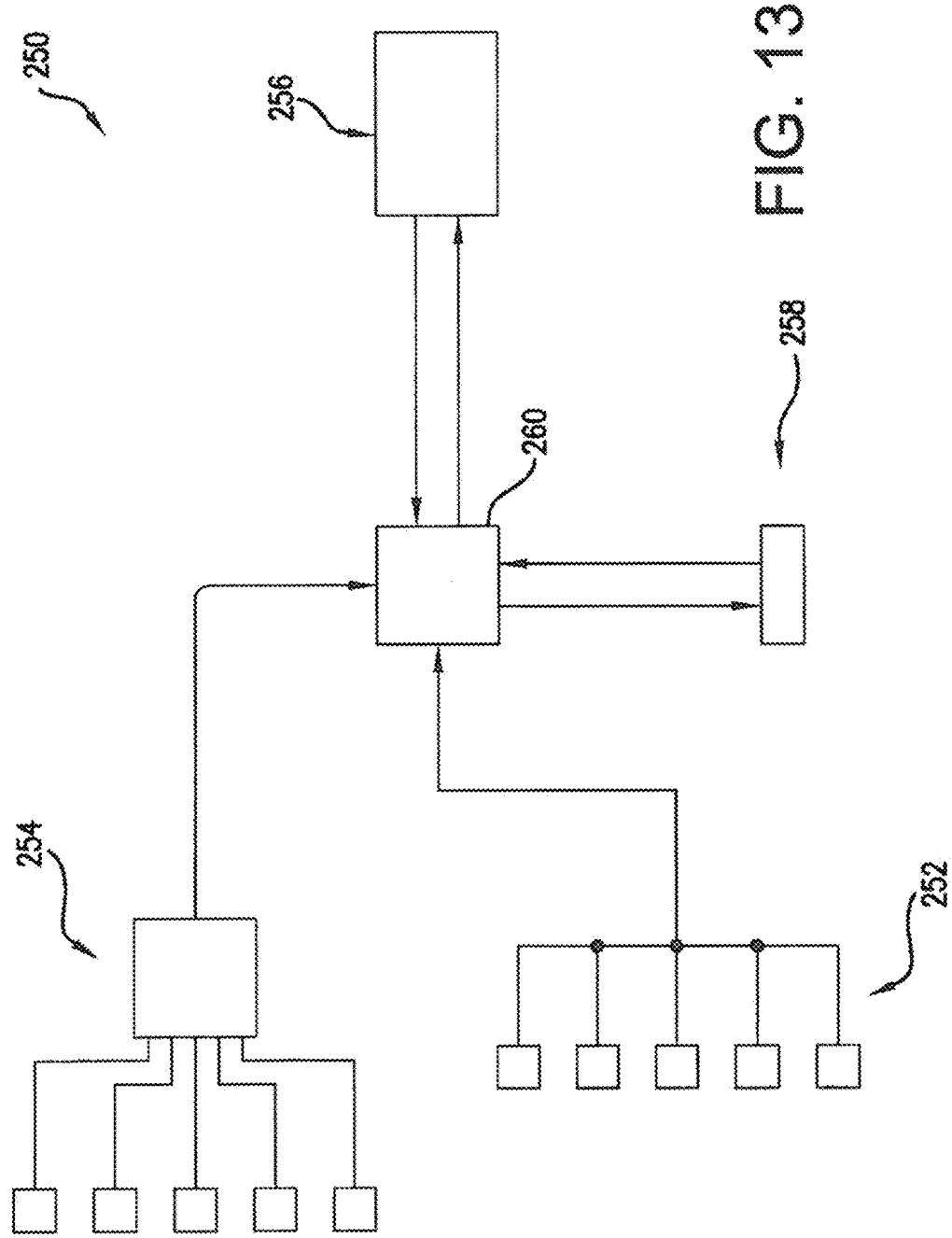
FIG. 13 is a strategic initiative system in accordance with an exemplary embodiment of the present disclosure.

While the methods of the present disclosure may be performed manually, because the required inputs may be from multiple locations, because the workforce required to implement strategic initiative 74 may be in multiple locations (geographically separated), and because of the need to dynamically predict outcome(s) 60 and impact(s) 62, a strategic initiative system 250, shown in FIG. 13, provides a way to conduct strategic initiative 74 in a dynamic environment in a plurality of geographic locations.

Strategic initiative system 250 includes a management system 252, an inventory system 254, an initiative interface system 256, a communication system 258, and a controller 260. Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program modules etc. being executed by one or more processors (e.g., one or more microprocessors, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Management system 252 is provided to certain members of executive management and leadership of the organization. Managers and leaders provide mission 68, core values 70, vision 42, goals 72, and strategy 44 to controller 260. Inventory system 254 is positioned throughout an organization in locations proximate to inventory, and is used by the workforce to maintain current inventory, including automated inventory checking systems. The status of inventory, which is one portion of inputs/resources 54, is also provided to controller 260. A strategic initiative team may use initiative interface system 256 to update and track situations or problems, objective(s) 46, measure(s) 48, target(s) 50, activities 56, and output(s) 58. In some embodiments, output(s) 58 may be reflected in inventory system 254, which then provides real time updates of output(s) 58. Inputs from the strategic initiative team are provided to controller 260.

Controller 260 receives the inputs from management system 252, inventory system 254, and initiative interface system 256 and provides predictive outcome(s) 60 and impact(s) 62. Because controller 260 may be asked to provide predictions of outcome(s) 60 and impact(s) 62 for situations previously not encountered, controller 260 may require additional programming and databases to support a specific strategic initiative 74. More specifically, a series of potential outcome(s) 60 and impact(s) 62 may be provided in a database. As a strategic initiative 74 proceeds, statistical methods may be used to select from among outcome(s) 60 and impact(s) 62. Because new outcome(s) 60 and impact(s) 62 may be developed or recognized during strategic initiative 74, a strategic initiative team may include a member whose specific purpose is to maintain an outcome(s) 60 and impact(s) 62 database.

In addition to analyzing inputs from the strategic initiative team, controller 260 provides current strategic initiative 74 data and information to initiative interface system 256 for the use of the strategic initiative team, and to communication system 258 for relay to the workforce, stakeholders, and leadership or management. Communication system 258 may include wired and wireless connections to controller 260, and may also include filters to limit dissemination of sensitive aspects of an organization's information to individuals with a need to know. For example, a portion of strategic initiative 74 may include specific profit information for specific products, which may be filtered by controller 260 to limit such information to percentages to certain portions of the workforce, stakeholders, and leadership or management.

Figure 14:
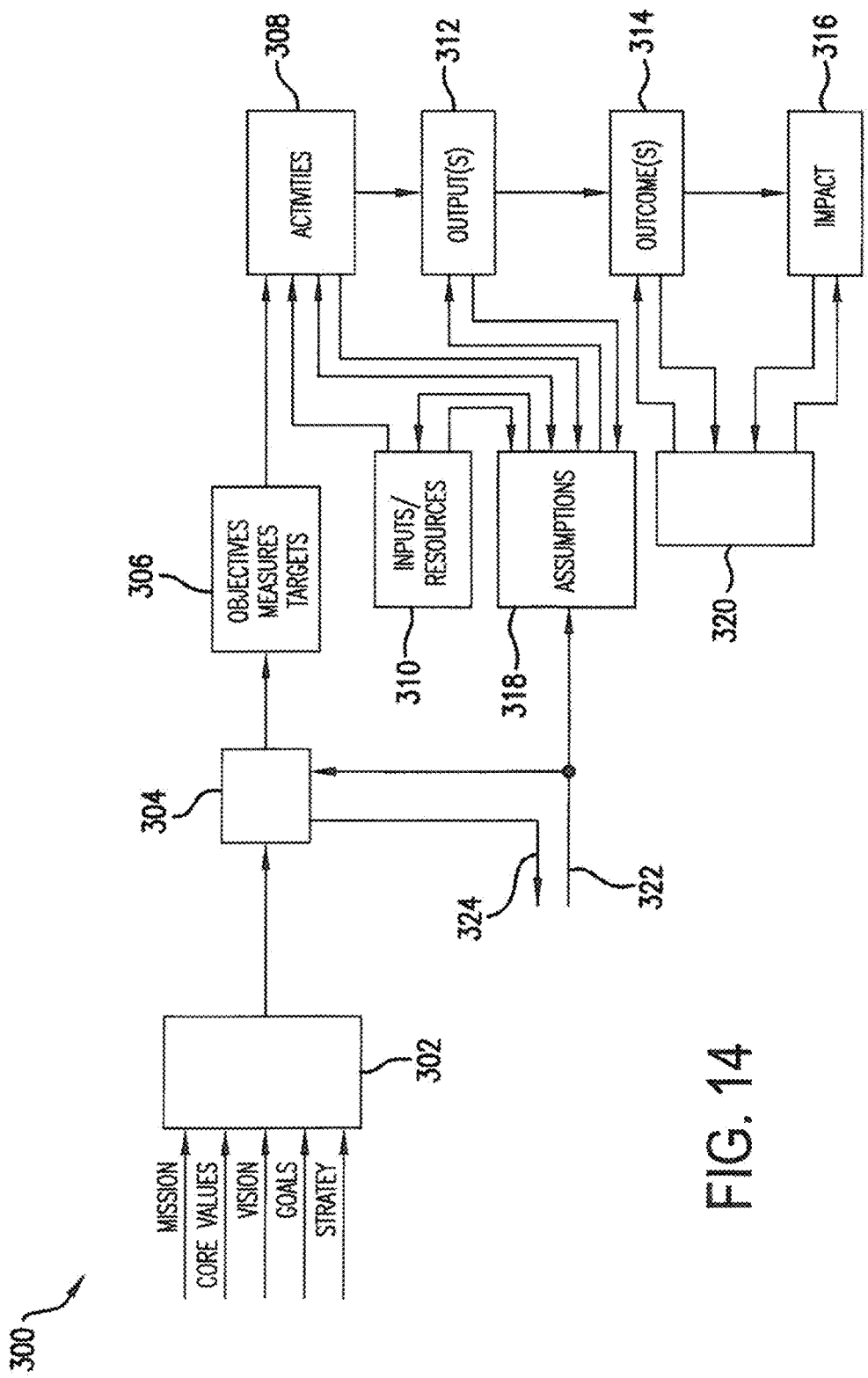
FIG. 14 is a strategic initiative module of the strategic initiative system of FIG. 13 in accordance with an exemplary embodiment of the present disclosure.

FIG. 14 provides a strategic initiative module, generally indicated at 300. Strategic initiative module 300 may be located in one or more of the systems of strategic initiative system 250. Process flow 100 may be located in one or more portions of strategic initiative module 300, as will be seen from the description hereinbelow. Strategic initiative module 300 includes a management inputs module 302, a strategic initiative generation module 304, an objectives, measures, and targets module 306, an activities module 308, an inputs/resources module 310, an output(s) module 312, an outcome(s) module 314, an impact(s) module 316, an assumption(s) module 318, and an external influence(s) module 320.

Management inputs module 302 receives a plurality of inputs from executive management or leadership, including mission 68, core values 70, vision 42, goals 72, and strategy 44. Management inputs module 302 receives the plurality of inputs and formats the inputs into a form capable of statistical analysis. For example, core values may include subjective characteristics such as customer orientation, environmental respect, and the like. Customer orientation may be received translated by management inputs module 302 and translated or transformed into specific characteristics, such as number of customer complaints, responses to customer surveys, and other numerical characteristics representative of customer orientation. In some instances, management inputs module 302 may transmit a request for clarification of management inputs to strategic initiative generation module 304, which then requires additional input from a member of the strategic initiative team in order to assist strategic initiative module 300 in providing the functions necessary to make a strategic initiative process functional.

Once translated into a measurable form, signals are transmitted from management inputs module 302 to strategic initiative generation module 304. Strategic initiative generation module 304 receives management inputs from management inputs module 302 and one or more situations and strategic initiative team inputs 322. Strategic initiative module 304 uses management inputs, situation information, in addition to inputs from the strategic initiative team to generate one or more strategic initiatives 74. Strategic initiative module 304 may analyze situations to suggest one or more strategic initiatives 74, transmitting them to the strategic initiative team by way of interactive strategic initiative outputs 324. The strategic initiative team may accept one of the proposed strategic initiatives or may provide their own strategic initiatives 74 by way of situations and strategic initiative team inputs 322.

Once specific strategic initiative(s) 74 are created, they are transmitted to objectives, measures, and targets module 306, where each strategic initiative 74 is populated with objectives 46, measures 48, and targets 50. Though not shown, the strategic initiative team may interface with objectives, measures, and targets module 306 to resolve issues with the development of achievable objectives 46, measures 48, and targets 50.

Objectives 46, measures 48, and targets 50 are provided to activities module 308, where specific activities 56 are developed to achieve objectives 46, measures 48, and targets 50. As with previous modules, activities module 308 may interface with the strategic initiative team to resolve issues with the development of activities 56. Activities module 308 also receives data from inputs/resources module 310, which includes information from inventory system 254, and information from assumptions module 318. Assumptions 64 may be required by activities module 308 because assumptions 64 may affect activities 56 determination. For example, activities module 308 may estimate labor inputs in terms of man-hours and schedule, but assumptions may include estimated downtime due to illness, delays in receipt of inputs/resources 54, facilities downtime, and other factors. Assumptions module 318 receives assumption information from strategic initiative team inputs 322. Once specific activities 56 have been developed, created, or determined, activities 56 are provided to output(s) module 312.

Output(s) module 312 takes activities 56 and calculates or estimates output(s) 58. In the case of subjective or qualitative outputs, output(s) module 312 may request additional inputs from the strategic initiative team. Output(s) module 312 also receives assumptions 64 from assumptions module 318 and uses assumptions 64 to adjust output(s) 58. Estimated, calculated, or determined output(s) 58 are provided to outcome(s) module 314.

Outcome(s) module 314 determines, calculates, or estimates potential outcome(s) 60, using information provided by management module 302 and strategic initiative generation module 304. In the event that outcome(s) module 314 is unable to determine at least one outcome 60, outcome module 314 may provide the potential outcome(s) 60 to the strategic management team, which may then adjust various inputs, including providing additional potential outcome(s) 60 to strategic initiative module 300, in order to better understand or predict potential outcome(s) 314. Generally, each predicted outcome(s) 60 will be associated with a statistically calculated probability or possibility. The strategic initiative team may then adjust various inputs to try to improve the chances of achieving a favorable outcome 60. Outcome(s) module 314 also receives information from external influence(s) module 320, which may affect possible outcome(s) 60. For example, one possible outcome 60 may be an improved volume of output of a specific product. However, external influence 66 may be a decreased demand or increased warranty, and the improved output may be unable to be realized because the current output is sufficient for the revised external conditions. Outcome(s) 60 are then provided to impact(s) module 316.

Impact(s) module 316 receives outcome(s) 60 and external influences information from external influences module 320, which determines possible impact(s) 62 using outcome(s) 60 and external influences 66. For example, if outcome 60 is improved output volume, and perhaps a reduced price, impact module 316 may predict, mathematically, an increased customer demand. However, impact module 316 may also predict new market entrants or potential replacement products as potential negative impacts, depending on the sophistication of impact module 316 and strategic initiative module 300.

It should be apparent from the foregoing discussion that the strategic initiative team may be in direct communication with modules 306, 308, 310, 312, 314, and 316. The connections to and from the strategic initiative team were not shown to simplify FIG. 14 and improve understanding of FIG. 14.

It should also be apparent from the foregoing descriptions that each of the processes and modules shown herein are preferably included at least partially in strategic initiative system 250, and each of the processes shown herein may be included in one or more modules shown herein, such as the modules of strategic initiative module 300.

Figure 15:
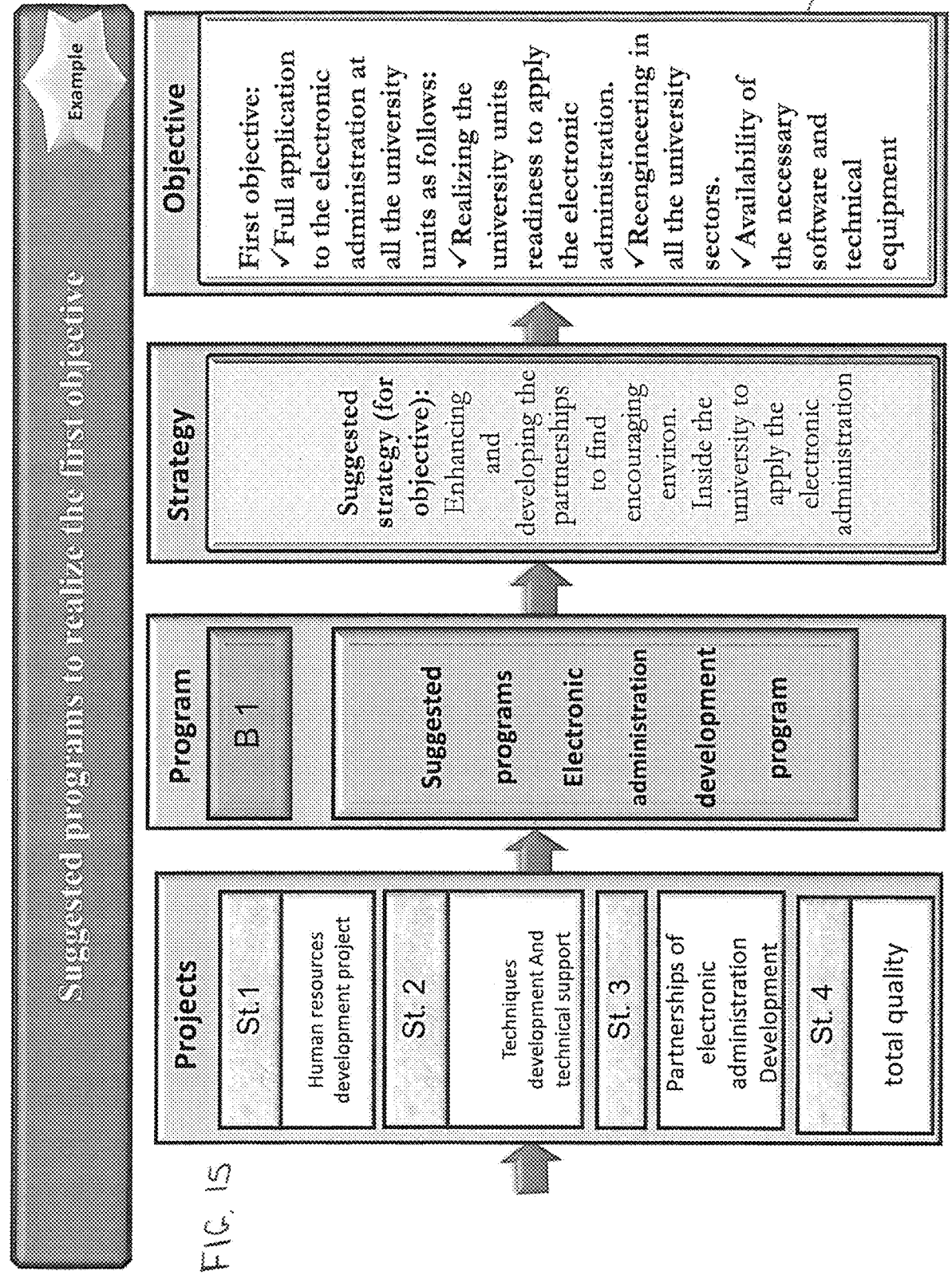
FIG. 15 is an example of the application of the integrated model in accordance with an exemplary embodiment of the present disclosure.
Figure 16:
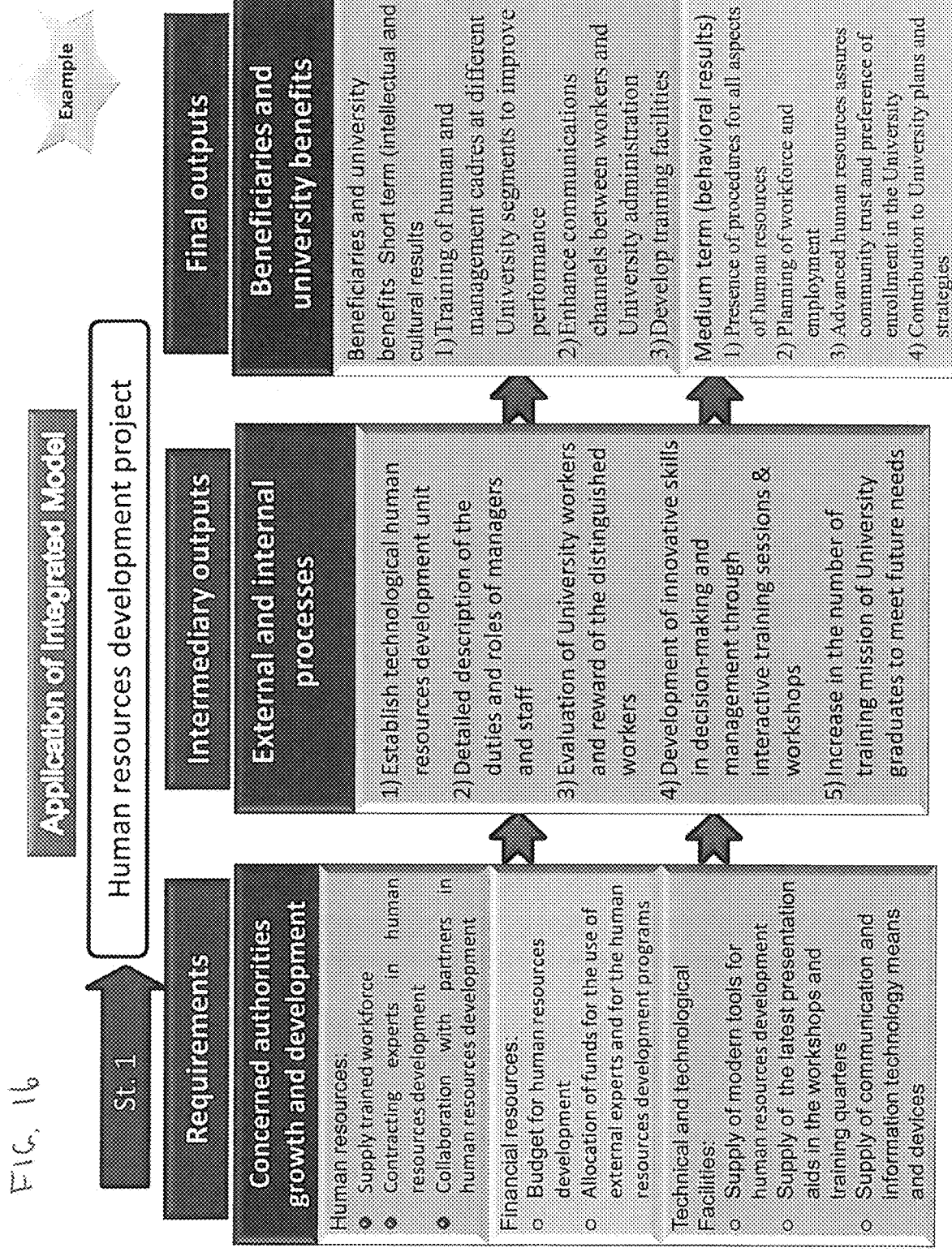
FIG. 16 is a first project of the example of FIG. 15.
Figure 17:
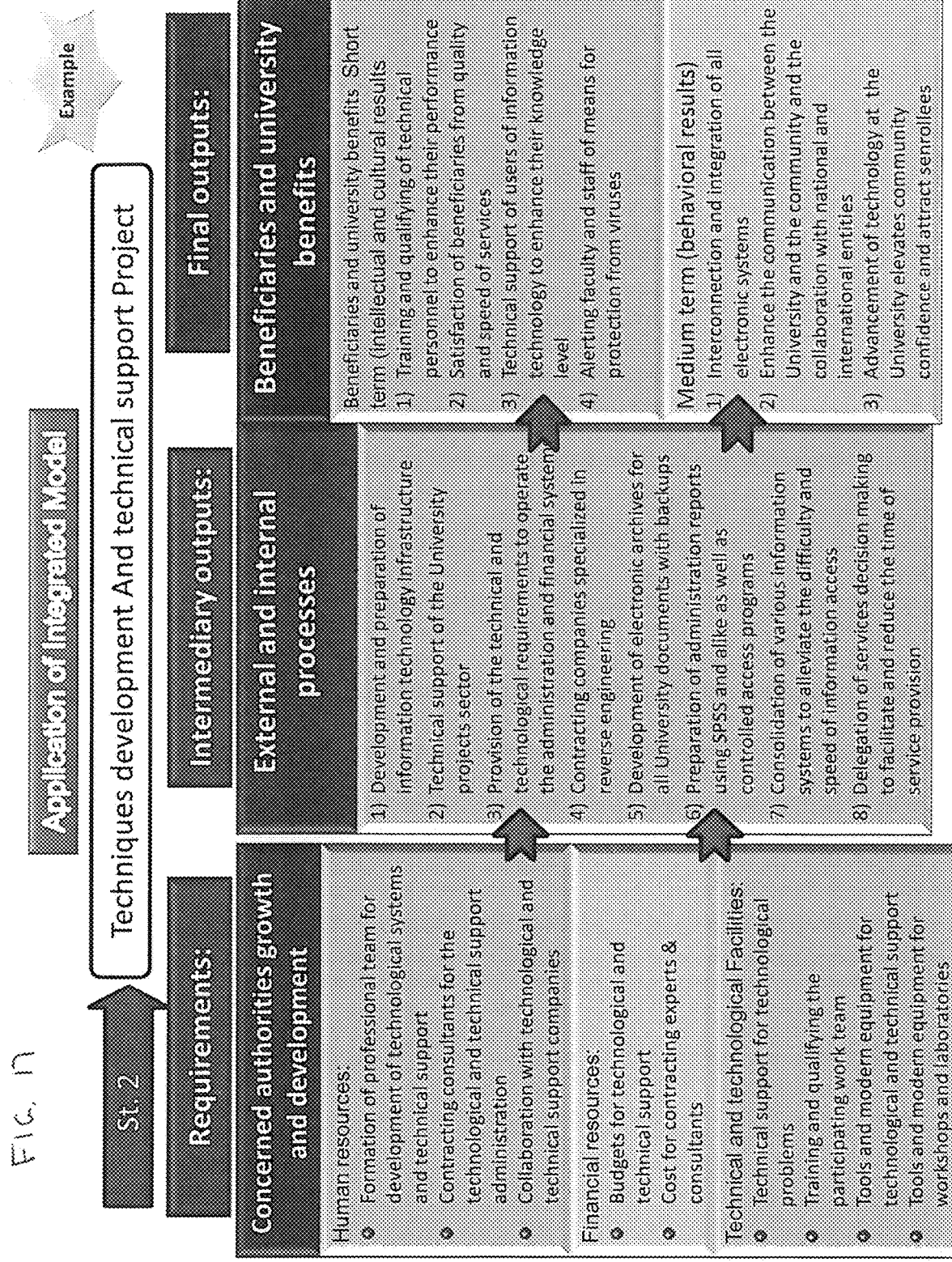
FIG. 17 is a second project of the example of FIG. 15.
Figure 18:
FIG. 18 is a third project of the example of FIG. 15.
Figure 19:
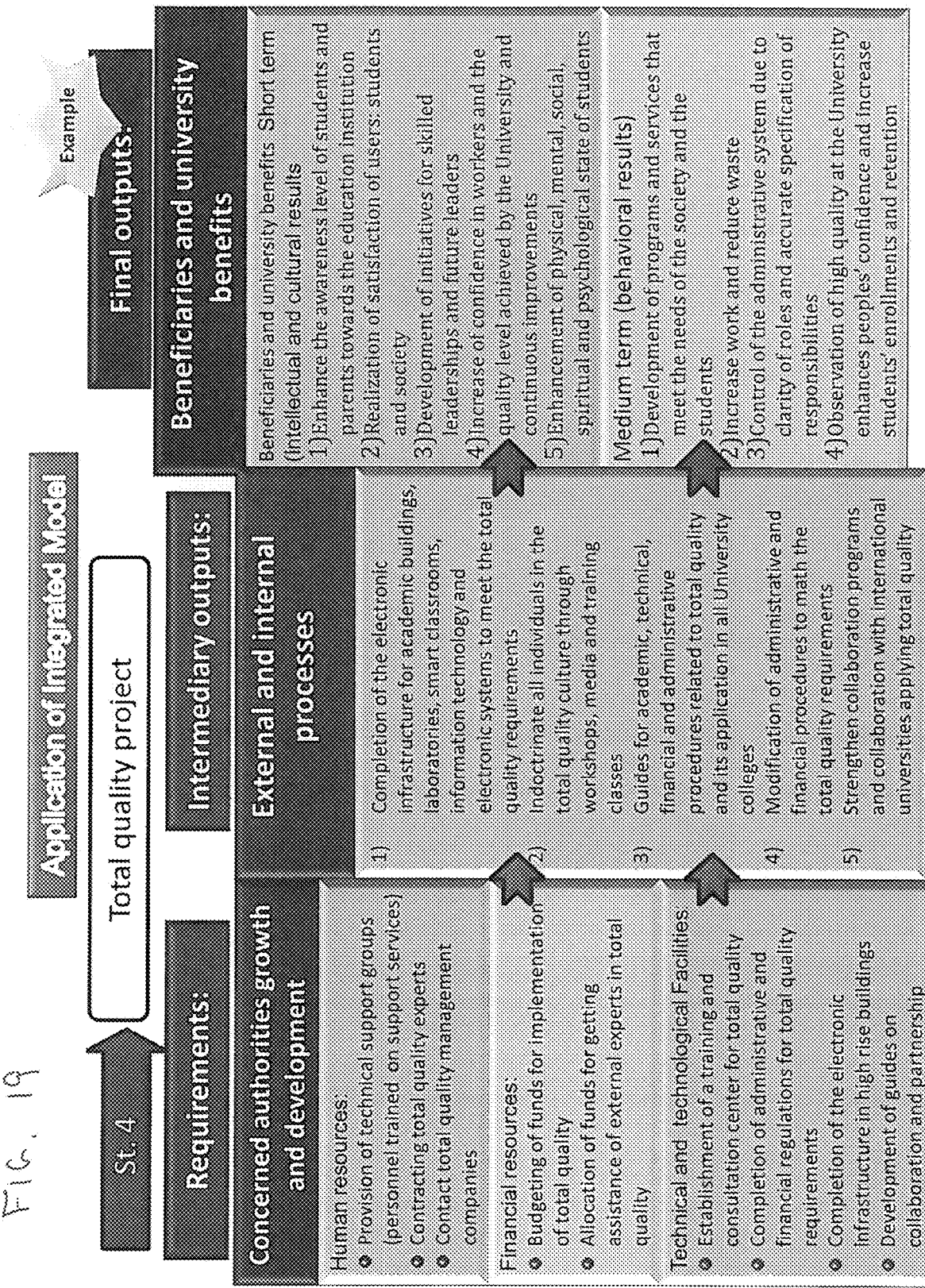
FIG. 19 is a fourth project of the example of FIG. 15.

Referring to FIGS. 15-19, an example of integrated model 40 as applied to a specific problem is shown. Referring to FIG. 15, a first objective 330 is shown. In order to realize the first objective, a plurality of projects, St. 1, St. 2, St. 3, and St. 4, are defined and shown in FIGS. 16-19. For each one of the projects, the inputs and resources are shown as requirements. The requirements then lead to one or more intermediary outputs, and finally yield one or more outcomes and outputs. In the case of each of the processes, the integrated model was used to transform the inputs into measurable and definable outputs or outcomes. In each of the projects, the complexity and geography of the projects was such that the systems, processes, and modules described herein were used to implement the transformation. Indeed, in each of the project portions St. 1, St. 2, St. 3, and St. 4, such projects, which may also be described as project modules, would have been impractical to conduct without the presence of the systems, processes, and modules described herein.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

I claim:

1. A system comprising:
 a processor having a non-transitory memory;
 a first input device connected to the processor;
 a second input device connected to the processor;
 a first input/output device connected to the processor;
 a communication system connected to the processor; and
 a template stored in the non-transitory memory,
 the processor being configured to:
  first receive a first input from the first input device, the first input device receiving the first input from a first user, the first input including a vision, a goal, and a strategy;
  second receive a resource input from the second input device;
  first transmit the first input to the first input/output device, the first input/output device being configured to:
   third receive the first input from the processor,
   present the first input to a second user,
   fourth receive a second input from the second user, the second input including an objective, a measure, and a target for a perspective, the objective, and the measure, and the target being generated in view of the vision, the goal, and the strategy, the perspective being at least one of an organization financial perspective, an organization customer perspective, an organization internal business processes perspective, and an organization learning and growth perspective, the objective including a causal relationship to the measure, and the measure including a causal relationship to the target, and
   second transmit the second input to the processor;
  the processor further configured to
   fifth receive the second input from the first input/output device;
   sixth receive at least one measurement of a plurality of activities;
   determine an outcome and an impact based at least in part on the second input, an inventory input, and the at least one measurement to thereby establish a causal link between the perspective, the outcome, and the impact;
   third transmit one or more of the vision, the goal, the strategy, the objective, the measure, the target, the outcome, the impact, and the causal link to a third user by way of the communication system; and
 the processor being configured to use the template for interactively documenting a plurality of the vision, the goal, the strategy, the objective, the measure, the target, the resource input, the organization financial perspective, the organization customer perspective, the organization internal business processes perspective, the organization learning and growth perspective, the outcome, the impact, and the at least one measurement, in a display, the processor positions the template inputs for the objective, the measure, the target, the resource input, the plurality of activities, the outcome, and the target in columns to correspond with the organization financial perspective, the organization customer perspective, the organization internal business processes perspective, the organization learning and growth perspective organized in rows.

2. The system of claim 1, including identification of at least one assumption associated with the strategy, estimation, calculation, or determination of at least one output from the plurality of activities, and adjustment of the estimation, calculation, or determination of the at least one output by the at least one assumption prior to the at least one output being used by the processor to determine the outcome.

3. The system of claim 1, wherein a plurality of resources supports the plurality of activities, and the template further includes a visual representation of a plurality of relationships between the vision, the plurality of resources, the plurality of activities, and the outcome determined by the processor, the visual representation being displayed on one or more of the first input/output device and a second input/output device by the processor.

4. The system of claim 1, wherein the objective is a plurality of objectives, and each one of the plurality of perspectives being associated with at least one of the plurality of objectives.

5. The system of claim 1, wherein the impact determined by the processor includes an intended change.

6. The system of claim 1, wherein the impact determined by the processor includes an unintended change.

7. The system of claim 1, including identification and input to the processor of at least one external influence associated with at least one of the outcome and the impact, the processor being configured to change the outcome based on the at least one external influence.

8. The system of claim 1, wherein the processor receives one or more of an adjusted first input, adjusted resource inputs, or an adjusted second input, the adjustment of the first input, the adjusted resource inputs, and the adjusted second input being based on the outcome and the impact to change the likelihood of achieving the outcome.

9. The system of claim 8, wherein the processor adjusts the outcome based on the adjusted first input, the adjusted resource inputs, and the adjusted second input.

10. The system of claim 9, wherein the processor transmits the adjusted outcome to the first input/output device and a second input/output device for further adjustment of one or more of the first input, the resource inputs, and the second input.

11. The system of claim 2, wherein the processor stores a strategic initiative in the non-transitory memory, and the at least one output is one or more of products, capital goods, and services that result from the strategic initiative.

* * * * *